(12) United States Patent
Swaminathan et al.

(10) Patent No.: US 8,806,193 B2
(45) Date of Patent: Aug. 12, 2014

(54) METHODS AND APPARATUS FOR INTEGRATING DIGITAL RIGHTS MANAGEMENT (DRM) SYSTEMS WITH NATIVE HTTP LIVE STREAMING

(75) Inventors: Viswanathan Swaminathan, Saratoga, CA (US); Kelly Yoshikazu Kishore, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 210 days.

(21) Appl. No.: 13/335,654

(22) Filed: Dec. 22, 2011

(65) Prior Publication Data

US 2013/0166906 A1    Jun. 27, 2013

(51) Int. Cl.
*H04L 29/00* (2006.01)
(52) U.S. Cl.
USPC ............ 713/155; 713/156; 713/157; 713/158
(58) Field of Classification Search
USPC .................................................. 713/155–158
See application file for complete search history.

(56) References Cited

U.S. PATENT DOCUMENTS

| | | | |
|---|---|---|---|
| 2010/0281056 A1* | 11/2010 | Nonaka et al. ................ | 707/770 |
| 2011/0231660 A1* | 9/2011 | Kanungo ...................... | 713/168 |
| 2012/0284804 A1* | 11/2012 | Lindquist et al. .............. | 726/29 |

OTHER PUBLICATIONS

"HTTP Live Streaming Overview," Apr. 1, 2011 Apple Inc., 38 pages.
R. Pantos, W. May, "HTTP Live Streaming (draft-pantos-http-live-streaming-07)," Internet draft, Sep. 30, 2011 Apple Inc., 34 pages.
"Technical Q&A QA1661: How to securely serve Key files for HTTP Live Streaming with HTTPS," Aug. 27, 2009, Apple Inc., 2 pages.
"HTTP Dynamic Streaming on the Adobe® Flash® Platform," Adobe Flash Platform Technical White Paper, Sep. 2010, Adobe Systems Incorporated, 18 pages.
"HTTP Dynamic Streaming," (HTTP Dynamic Streaming Datasheet), Apr. 2010 Adobe Systems Incorporated, 2 pages.

* cited by examiner

*Primary Examiner* — Ghazal Shehni
(74) *Attorney, Agent, or Firm* — Wolfe-SMBC

(57) ABSTRACT

Methods and apparatus for integrating digital rights management (DRM) systems with native HTTP live streaming. Several methods for integrating a DRM system with HTTP live streaming on an operating system (OS) platform are described. In each of these methods, a manifest is delivered to an application on a device; the application then accesses a remote DRM server to obtain a license and one or more keys for the content. The DRM server enforces the rights of the client in regard to the indicated content. The application may modify the manifest to indicate a method for obtaining the key. The application delivers the manifest to the OS, which uses the indicated method (e.g., a URL) to obtain the key. While similar, the methods primarily differ in the manner in which the OS is directed to obtain the key.

23 Claims, 18 Drawing Sheets

METHODS AND APPARATUS FOR INTEGRATING DIGITAL RIGHTS MANAGEMENT (DRM) SYSTEMS WITH NATIVE HTTP LIVE STREAMING

BACKGROUND

Description of the Related Art

Some operating systems, for example Apple® iOS technology, support HTTP (Hypertext Transfer Protocol) live streaming. For example, Apple has proposed an HTTP live streaming (HLS) protocol, and mandates that only that HLS protocol should be used to deliver live video streaming over Cellular networks to Apple's iOS platform devices (typically, but not necessarily, mobile devices such as smart phones and pad computing devices). OS (operating system) platform devices, including but not limited to Apple iOS devices, may natively (hardware+firmware) support the HLS playback protocol. While various OS platforms such as Apple's iOS may provide a mechanism to encrypt video streams according to the HLS protocol, the OS platforms (e.g., iOS) generally do not provide a mechanism to support more robust digital rights management (DRM), for example DRM for HTTP live streaming through an OS platform such as iOS.

FIG. 1 illustrates a conventional model for providing HTTP live streaming on an OS platform such as the iOS platform according to an HLS protocol. An application 104 may be installed on a device 100 configured according to an operating system (OS) 102 platform such as Apple's iOS. The device 100 may be, but is not necessarily, a mobile device such as a smart phone or pad device. The application 104 may obtain a manifest 106 for some content, for example a content 132 hosted on a content server 130. The manifest 106 may include a URL (Uniform Resource Locator) for an HTTPS (Hypertext Transfer Protocol Secure) server and possibly other metadata, and may also include a playlist that indicates one or more contents 132. As an example of a manifest file, Apple's HLS protocol supports playlist (manifest) files in M3U file format; these M3U playlists may be indicated by the file extension ".m3u8" or similar. The application 104 may forward the manifest file 106 to the OS 102. The OS 102 may then use the HTTPS server URL in the manifest file 106 to obtain a key 122 for the content 132 indicated by the manifest file 106 from an HTTPS server 120 using the HTTPS protocol. HTTPS server 120 maintains a database of keys 122 for content 132, and looks up the key for the appropriate content 132 in the database according to content information provided by the OS 102 on device 100. The OS 102 may then stream the content 132 indicated by the manifest file 106 from the content server 130, using the key 122 to locally decrypt the data in the stream. The OS 102 may, but does not necessarily, pass the streamed content to the application 104.

Digital Rights Management (DRM) systems exist that provide DRM for various content. For example, Adobe® Flash® Access® technology is an example DRM system that manages licenses, rights, and keys in addition to providing encryption and security to protect Adobe® Flash® technology content end to end through its life cycle.

Currently, there are no easy ways to integrate a DRM system such as Adobe Flash Access technology DRM systems with HTTP live streaming on platforms such as the Apple iOS platform that natively (hardware+firmware) support an HTTP live streaming protocol such as the HLS protocol proposed by Apple. For example, Adobe®AIR® (Adobe Integrated Runtime) applications can be deployed on iOS platform devices only via the AIR packager technology for iOS, which does not support Adobe Flash Access technology.

"Adobe," "Flash," "Flash Access," and "AIR" are either registered trademarks or trademarks of Adobe Systems Incorporated in the United States and/or other countries. "Apple" is a registered trademark of Apple Inc.

SUMMARY

Various embodiments of methods and apparatus for integrating digital rights management (DRM) systems with native HTTP live streaming are described. Several methods for integrating a DRM system that provides management of digital rights and keys with HTTP live streaming are described. These methods may, for example, be used to integrate Adobe Flash Access technology DRM systems with native HLS decryption and playback on Apple iOS platform devices. Using embodiments of these methods, content is still encrypted and streamed over HTTP following the native OS guidelines (e.g., Apple's HLS guidelines for iOS). In these methods, the content key(s) may be used to generate content metadata (e.g., Flash Access content metadata) as if the content is encrypted for native DRM clients. This content metadata may be delivered to the client application on a device along with the manifest file (e.g., an M3U file format HLS playlist) and the media (e.g., MPEG-2 TS) files referred in the manifest file. The client application uses the content metadata to acquire a license that contains the content encryption key. This key may then be provided to the OS media player (e.g., the iOS platform media player) in one of several ways as described herein.

Using these methods, a customer may use a single system DRM, for example a Flash Access technology DRM system, to securely deliver content to client applications, for example client applications on devices that implement an OS platform such as Apple's iOS platform. These methods may be implemented while preserving the caching of content and licenses to provide scalability. Moreover, these methods enable more robust and complete digital rights management of content delivered to client applications installed on devices than is provided by the OS platform of the device itself.

In a general method for integrating a DRM system with HTTP live streaming on an OS platform such as the iOS platform, an application on a device configured according to an operating system (OS) platform such as Apple's iOS obtains a manifest file that includes content metadata. The application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server may also include the content encryption key, or alternatively a token that includes the encrypted key. In at least some embodiments, the application may then construct a URL that directs the OS to a source for obtaining the content encryption key for the content indicated by the manifest file. The application may then provide the manifest including the URL for obtaining the key to the OS on the device. The OS then obtains the key from the source according to the URL in the manifest. The content server then streams the content to the device, which uses the key(s) to decrypt the data.

Several methods for integrating a DRM system with HTTP live streaming on an OS platform such as the iOS platform are described that are based on the general method described above. In each of these methods, a manifest file is delivered to a client application on a device, and the application then accesses a remote DRM server to obtain a license and one or more keys for the content. The DRM server enforces the DRM rights of the client in regard to the indicated content. The application then modifies the manifest file to indicate a method for obtaining the key for the data and delivers the manifest file to the OS. While similar, the methods primarily differ in the manner in which the OS (e.g., a media player module of the OS platform) is directed to obtain the key for content indicated by a manifest file such as an M3U playlist. The methods may also differ in regards to the level of security provided by the methods.

In a first method, a file URL is used to direct the OS to a locally stored file that contains the key. In a second method, a localhost URL is used to direct the OS to a local (on the device) HTTP server that looks up and returns the key via HTTP. In a third method, a localhost URL is used to direct the OS to a local HTTPS server that looks up and returns the key via HTTPS. In a fourth method, an application-defined URL is used to direct the OS to a module that retrieves the key from a secure local store and returns the key. In a fifth method, an HTTPS service URL is used to direct the OS to a stateless remote HTTPS service; the encrypted key is included in the URL, and is extracted, decrypted, and returned to the OS by the HTTPS service.

Figure 1:
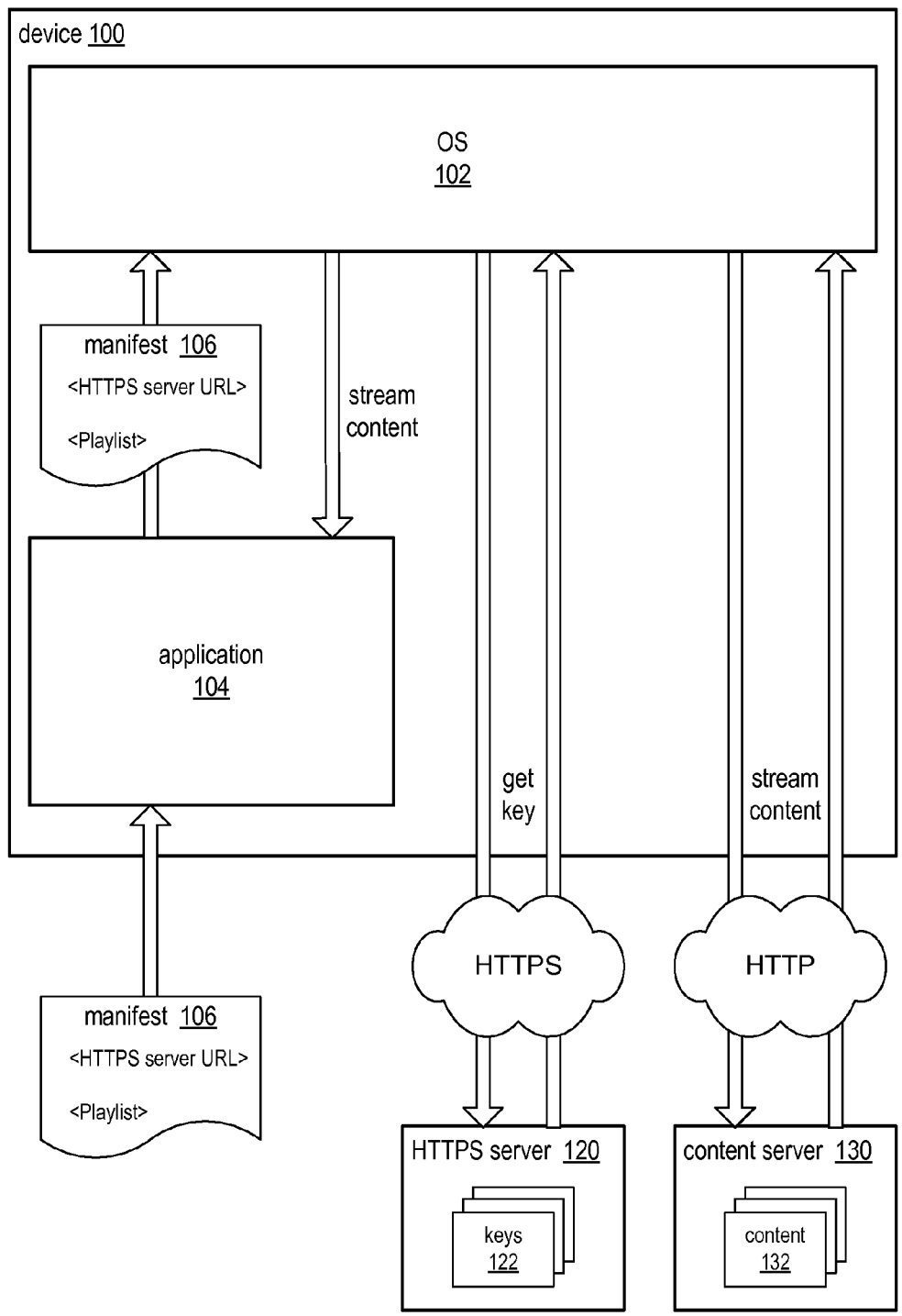
FIG. 1 illustrates a conventional model for providing HTTP live streaming on an OS platform such as the iOS platform.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for integrating digital rights management (DRM) systems with native HTTP live streaming are described. Several mechanisms are described that may be used to integrate DRM systems, for example Adobe's Flash Access DRM system, with native HTTP live streaming mechanisms, for example Apple's native iOS HTTP live streaming (HLS) mechanism, on devices including but not limited to mobile devices. In addition, embodiments of methods and apparatus are described for delivering keys for HTTP live streaming that do not require an HTTPS server to maintain a database of keys, such as HTTPS server 120 illustrated in FIG. 1.

Integrating DRM Systems with Native HTTP Live Streaming

Several methods for integrating a DRM system that provides management of digital rights and keys with HTTP live streaming on an OS platform are described. These methods may, for example, be used to integrate Adobe Flash Access with native HLS decryption and playback on Apple iOS platform devices. Using embodiments of these methods, content is still encrypted and streamed over HTTP following the native OS guidelines (e.g., Apple's HLS guidelines for iOS). In these methods, the content key(s) may be used to generate content metadata (e.g., Flash Access content metadata) as if the content is encrypted for native DRM clients. This content metadata may be delivered to the client application on a device along with the manifest file (e.g., an M3U playlist) and the media (e.g., MPEG-2 TS) files referred in the manifest file. The client application uses the content metadata to acquire a license that contains the content encryption key. This key is then provided to the OS media player (e.g., the iOS media player) in one of several ways as described herein.

Figure 2:
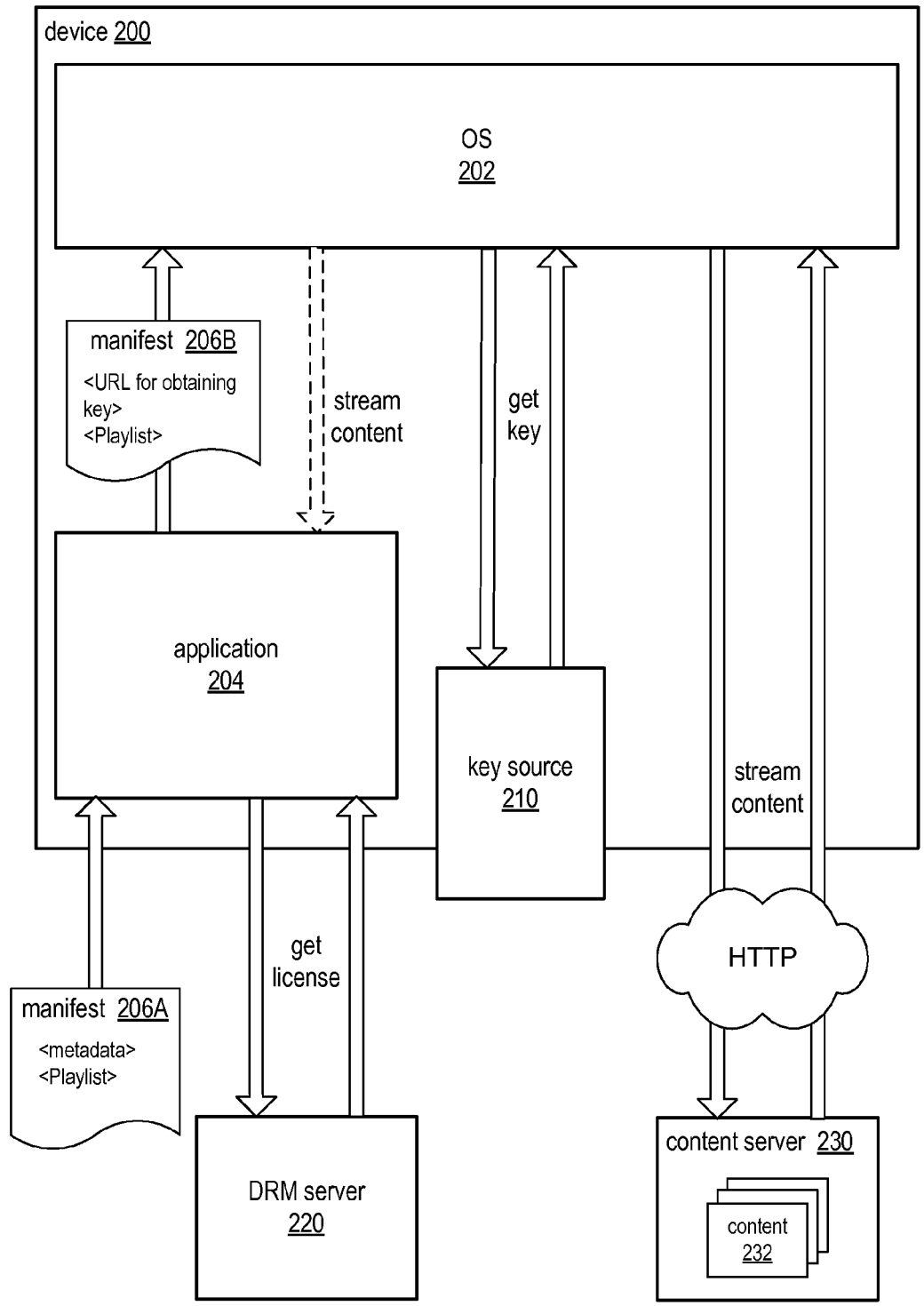
FIG. 2 illustrates data flow in a general model for integrating a DRM system with HTTP live streaming on an OS platform such as the iOS platform, according to at least some embodiments.

FIG. 2 illustrates data flow in a general model for integrating a DRM system with HTTP live streaming on an OS platform such as the iOS platform, according to at least some embodiments. An application 204 may be installed on a device 200 configured according to an operating system (OS) 202 platform such as Apple's iOS. The device 200 may be, but is not necessarily, a mobile device such as a smart phone or pad device. The application 204 may obtain a manifest 206A for some content, for example a content 232 hosted on a content server 230. However, instead of or in addition to containing an HTTPS server URL as in FIG. 1, manifest 206A may contain content metadata for obtaining digital rights (e.g., a digital license) from a digital rights management (DRM) server 220. The application 204 may then use the metadata, along with identifying information for the particular client (e.g., the owner of device 200 and/or device credentials), to obtain a license for the content indicated by the manifest 206A from the DRM server 220. The license returned by the DRM server 220 to the application 204 indicates the digital rights in regard to the respective content for this client as determined by the DRM server 220. The license returned by the DRM server 220 may also include the content encryption key, or alternatively a token that includes the encrypted key. A token may also include other information such as information that individualizes the token to the client device. In some of the methods, the key may be locally stored by the application 204. The application 204 may then modify the manifest 206A to generate a modified manifest 206B containing a URL for obtaining the key received from the DRM server 220 and provide the manifest 206B to the OS 202 (e.g., to a media player module of the OS 202). The OS 202 may then obtain the key from a key source 210 indicated by the URL in the manifest 206B. The OS 202 may stream the content 232 indicated by the manifest 206B from the content server 230 to the application 204, using the obtained key to locally decrypt the data in the stream. However, in some implementations, the OS 202 (e.g., a media player module of the OS platform) may directly handle the content 232 stream, and thus in these applications the content 232 may not be streamed to the application 204.

Figure 8:
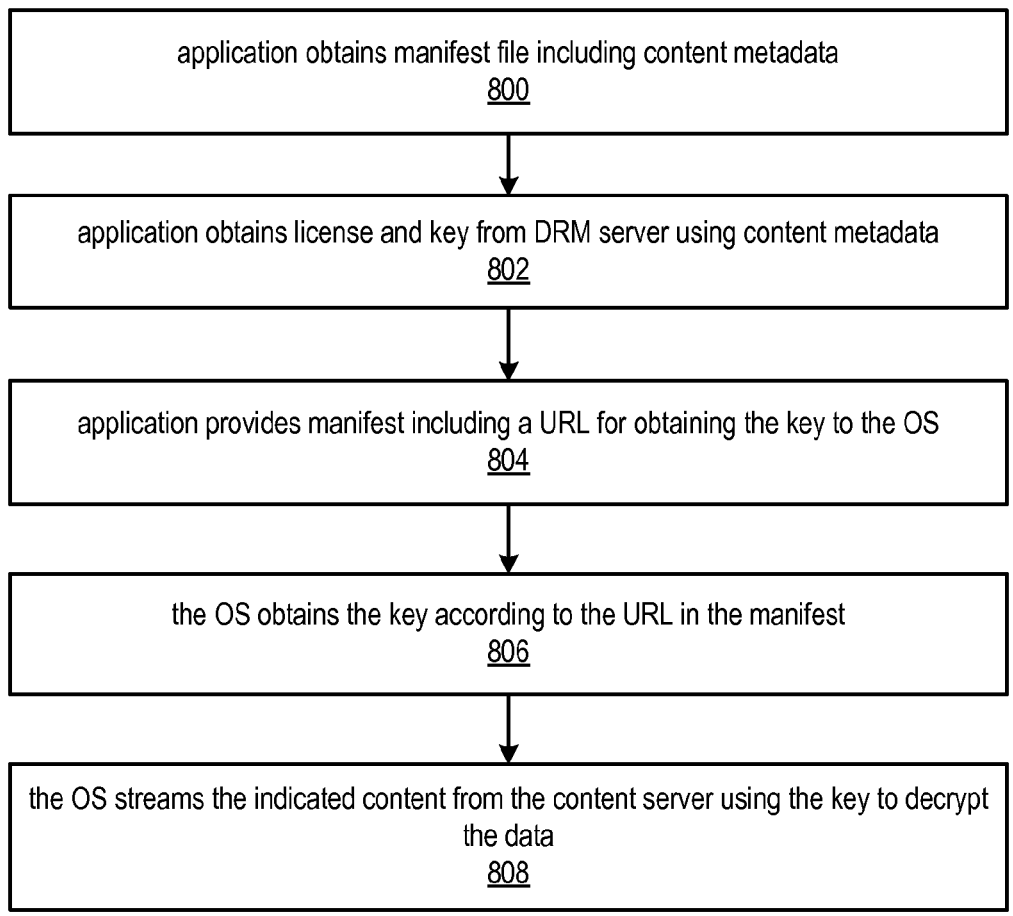
FIG. 8 is a high-level flowchart of a general method for integrating a DRM system with HTTP live streaming on an OS platform such as the iOS platform, according to at least some embodiments.

FIG. 8 is a high-level flowchart of a general method for integrating a DRM system with HTTP live streaming on an OS platform such as the iOS platform, according to at least some embodiments. As indicated at 800, an application on a device configured according to an operating system (OS) platform such as Apple's iOS obtains a manifest file that includes content metadata. As indicated at 802, the application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server 220 may also include the content encryption key, or alternatively a token that includes the encrypted key. In at least some embodiments, the application may then construct a URL that directs the OS to a source for obtaining the content encryption key for the content indicated by the manifest file. As indicated at 804, the application may then provide the manifest including the URL for obtaining the key to the OS (e.g., to a media player module of the OS). As indicated at 806, the OS then obtains the key from the source according to the URL in the manifest. As indicated at 808, the OS may then stream the content indicated by the manifest file from the content server, using the obtained key to locally decrypt the encrypted data in the stream received from content server. The OS may, but does not necessarily, pass the streamed content to the application.

The following describes several methods for integrating a DRM system with HTTP live streaming on an OS platform such as the iOS platform based on the general method described above. In each of these methods, a manifest file is delivered to a client application on a device, and the application then accesses a remote DRM server to obtain a license and one or more keys for the content. The DRM server enforces the DRM rights of the client in regard to the indicated content. The application then modifies the manifest file to indicate a method for obtaining the key for the data and delivers the manifest file to the OS. While similar, the methods primarily differ in the manner in which the OS is directed to obtain the key for content indicated by a manifest file such as an M3U playlist. The methods may also differ in regards to the level of security provided by the methods.

In a first method, a file URL is used to direct the OS to a locally stored file that contains the key. In a second method, a localhost URL is used to direct the OS to a local (on the device) HTTP server that looks up and returns the key via HTTP. In a third method, a localhost URL is used to direct the OS to a local HTTPS server that looks up and returns the key via HTTPS. In a fourth method, an application-defined URL is used to direct the OS to a module that retrieves the key from a secure local store and returns the key. In a fifth method, an HTTPS service URL is used to direct the OS to a stateless remote HTTPS service; the encrypted key is included in the URL, and is extracted, decrypted, and returned to the OS by the HTTPS service.

Using these methods, a customer may use a single system DRM, for example a Flash Access DRM server, to securely deliver content to client applications, for example client applications on devices that implement an OS platform such as Apple's iOS platform. These methods may be implemented while preserving the caching of content and licenses to provide scalability. Moreover, these methods enable more robust and complete digital rights management of content delivered to client applications on devices that implement an OS platform such as iOS than is provided by the OS platform itself.

While these methods are generally described in reference to streaming content from a remote content server, at least some of the methods may be used for offline use cases (i.e., for streaming content locally on an OS platform device).

Method Using Local Files and File URLs

In this method, a file URL (file://...) is used to direct the OS to a locally stored file that contains the key for decrypting data in an HTTP file stream. A manifest file (e.g., an M3U playlist) is obtained by the application from some source. A license and one or more keys for the indicated content are retrieved by the application according to metadata in the manifest file from a DRM server that enforces the digital rights of the client for the specified content. The key is stored in a local file specific to the application, for example a "hidden" file in a secure file area accessible and visible only to the application (and the OS) on the device. The manifest file is modified to contain the file URL (file://...) of the local file that contains the key. The manifest file is then passed to the OS, which uses the file URL to retrieve the key from the local file. In at least some embodiments, for security purposes, the local file is ephemeral and temporary; that is, the local file exists only for a short period of time, and is then deleted by the application.

This method may provide relatively low security compared to the other methods, and thus may generally be used for content for which security is not of high concern such as content that has no long-term value. For example, this method may be used for paid-access streams of live events that are made available for free after the event.

Figure 3:
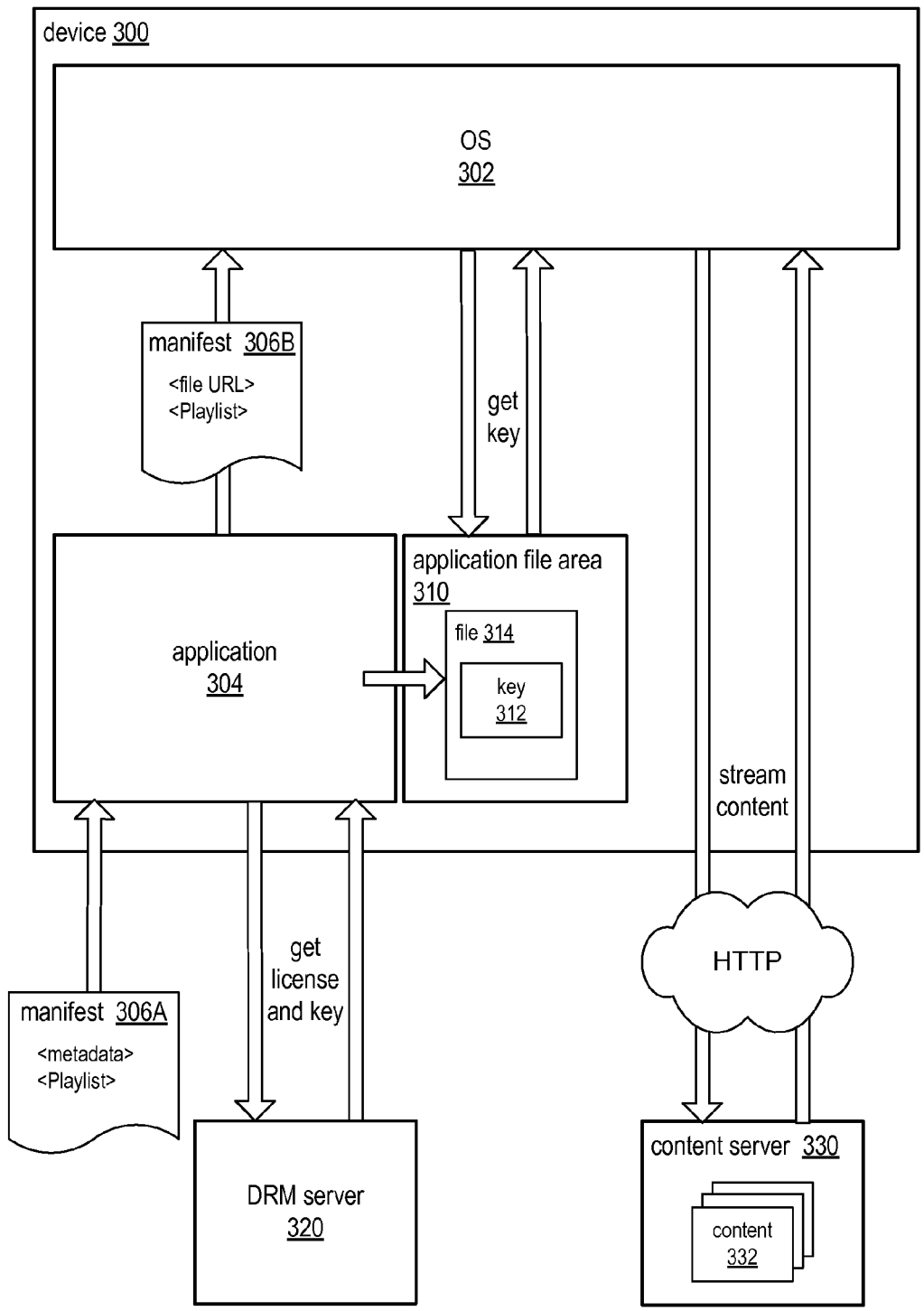
FIG. 3 illustrates data flow in a method for integrating a DRM system with HTTP live streaming on an OS platform in which a file URL is used to direct the OS to a locally stored file that contains the key, according to at least some embodiments.

FIG. 3 illustrates data flow in a method for integrating a DRM system with HTTP live streaming on an OS platform in which a file URL is used to direct the OS to a locally stored file that contains the key, according to at least some embodiments. An application 304 may be installed on a device 300 configured according to an operating system (OS) 302 platform such as Apple's iOS. The device 300 may be, but is not necessarily, a mobile device such as a smart phone or pad device. The application 304 may obtain a manifest 306A for some content, for example a content 332 hosted on a content server 330. Manifest 306A may contain content metadata for obtaining digital rights (e.g., a digital license) from a digital rights management (DRM) server 320. The application 304 may then use the metadata, along with identifying information for the particular client (e.g., the owner of device 300), to obtain a license for the content indicated by the manifest 306A from the DRM server 320. The license returned by the DRM server 320 to the application 304 indicates the digital rights in regard to the respective content for this client as determined by the DRM server 320. The license returned by the DRM server 320 may also include the content encryption key 312. The key 312 may be stored in a local file 314 specific to the application, for example a "hidden" file in a secure file area 310 accessible and visible only to the application (and the OS) on the device 300. In at least some embodiments, local file 314 may be a temporary file that is deleted after a relatively short specified period. The manifest 306A is modified to generate a modified manifest 306B containing the file URL (file://...) of the local file 314 that contains the key 312. The application 304 may then provide the manifest 306B to the OS 302 (e.g., to a media player module of the OS 302); the manifest 306B includes the file URL for obtaining the key 312 received from the DRM server 320. The OS 302 may then obtain the key 312 from application file area 310 according to the file URL in the manifest 306B. The OS 302 may then stream the content 332 indicated by the manifest file 306B from the content server 330, using the obtained key to locally decrypt the encrypted data in the stream received from content server 330. The OS 302 may, but does not necessarily, pass the streamed content 332 to the application.

Figure 9:
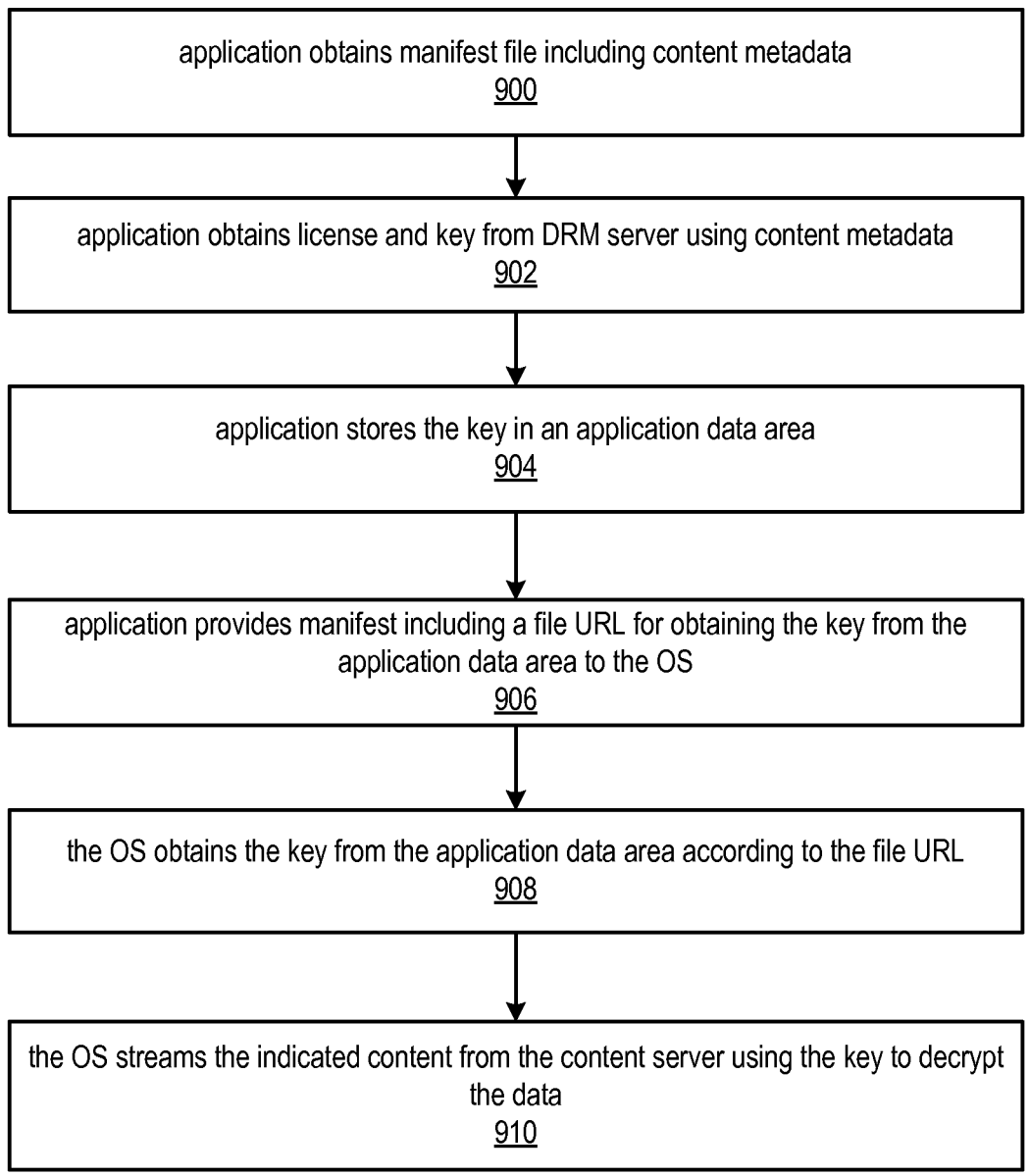
FIG. 9 is a flowchart of a method for integrating a DRM system with HTTP live streaming on an OS platform in which a file URL is used to direct the OS to a locally stored file that contains the key, according to at least some embodiments.

FIG. 9 is a flowchart of a method for integrating a DRM system with HTTP live streaming on an OS platform in which a file URL is used to direct the OS to a locally stored file that contains the key, according to at least some embodiments. As indicated at 900, an application on a device configured according to an operating system (OS) platform such as Apple's iOS obtains a manifest file that includes content metadata. As indicated at 902, the application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server may also include the content encryption key. As indicated at 904, the key may be stored in a local file specific to the application, for example a "hidden" file in a secure file area accessible and visible only to the application (and the OS) on the device. In at least some embodiments, the local file may be a temporary file that is deleted after a relatively short specified period. The manifest file is modified to contain the file URL (file://...) of the local file that contains the key. As indicated at 906, the application may then provide the manifest including the file URL for obtaining the key to the OS (e.g., to a media player module of the OS). As indicated at 908, the OS obtains the key from the local file according to the file URL in the manifest file. As indicated at 910, the OS may then stream the content indicated by the manifest file from the content server, using the obtained key to locally decrypt the encrypted data in the stream received from content server. The OS may, but does not necessarily, pass the streamed content to the application.

Method Using Local HTTP Server, HTTP, and Localhost URLs

In this method, a localhost URL is used to direct the OS to an HTTP server on the device on which the application resides; the local HTTP server provides the key for decrypting data in the HTTP file stream to the OS via HTTP. The HTTP server may be bundled with the application or may be otherwise obtained and installed on the device. A manifest file (e.g., an M3U playlist) is obtained by the application from some source. A license and one or more keys for the indicated content are retrieved by the application according to metadata in the manifest file from a DRM server that enforces the digital rights of the client for the specified content. The key is provided to and hosted by the local HTTP server. The original manifest file is modified to contain the localhost URL for obtaining the key. The manifest file is then passed to the OS, which uses the localhost URL to retrieve the key from the local HTTP server. The key is delivered from the local HTTP server to the OS over HTTP.

Using this method, the key is delivered in the clear (unencrypted) over HTTP, and thus there may be some associated security risk. Various techniques to improve security in this method may be used in embodiments. For example, the local HTTP server may be only temporarily available, and may be configured to provide the key only to a single requesting application (e.g., the OS) over HTTP with a randomized port number. A randomized port number may be used to make it more difficult for a process that somehow obtains the URL to reuse the URL. As another example, the local HTTP server may allow only one request to a localhost URL, or the localhost URL may stop working after multiple requests. As another example, attempts to capture the network packets may be monitored, and the application may respond appropriately to such attempts. Thus, this method may provide a low to medium level of security when compared to the other methods.

Figure 4:
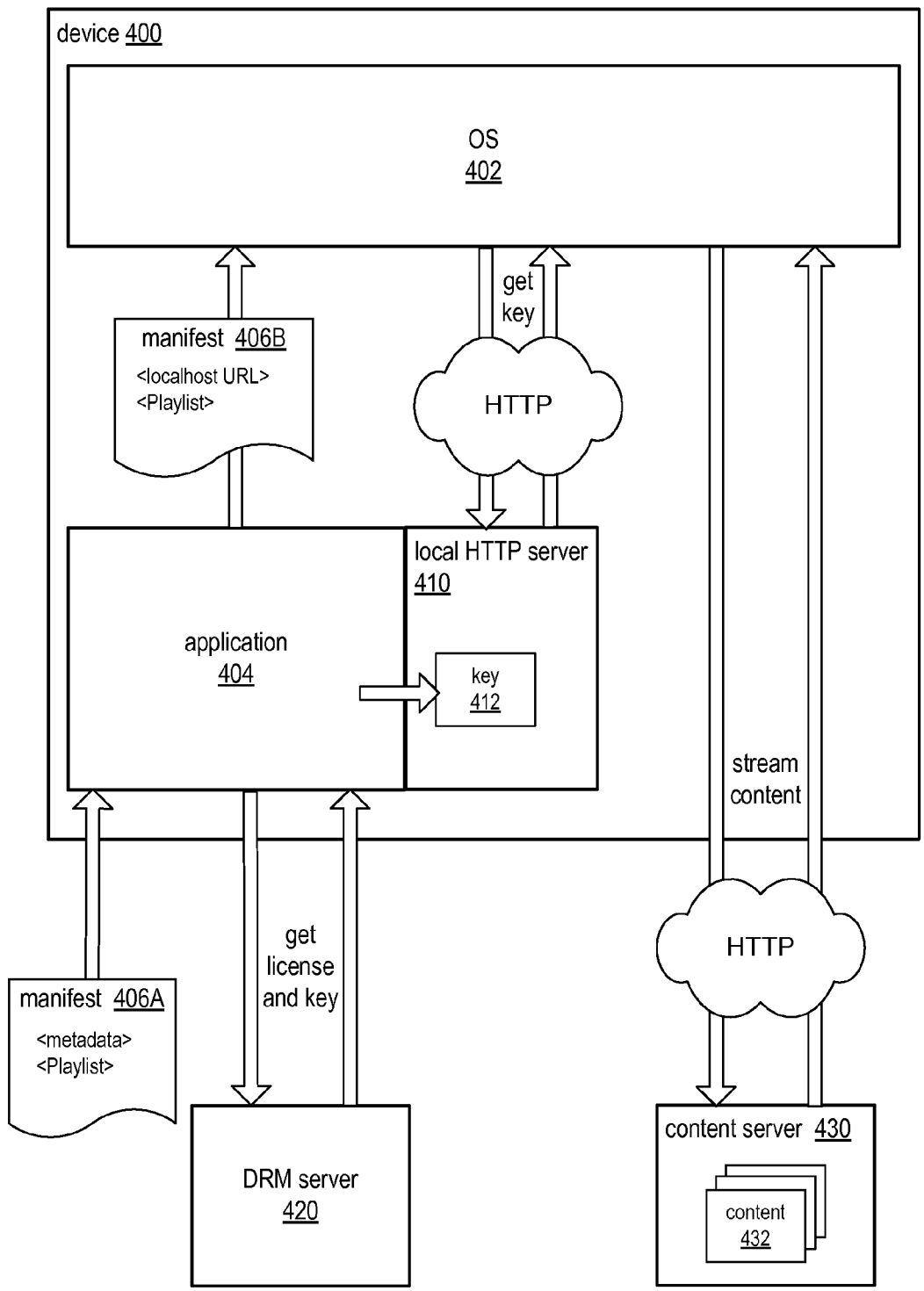
FIG. 4 illustrates data flow in a method for integrating a DRM system with HTTP live streaming on an OS platform in which a localhost URL is used to direct the OS to a local HTTP server that looks up and returns the key via HTTP, according to at least some embodiments.

FIG. 4 illustrates data flow in a method for integrating a DRM system with HTTP live streaming on an OS platform in which a localhost URL is used to direct the OS (e.g., a media player module of the OS) to a local HTTP server that looks up and returns the key via HTTP, according to at least some embodiments. An application 404 may be installed on a device 400 configured according to an operating system (OS) 402 platform such as Apple's iOS. The device 400 may be, but is not necessarily, a mobile device such as a smart phone or pad device. The application 404 may obtain a manifest 406A for some content, for example a content 432 hosted on a content server 430. Manifest 406A may contain content metadata for obtaining digital rights (e.g., a digital license) from a digital rights management (DRM) server 420. The application 404 may then use the metadata, along with identifying information for the particular client (e.g., the owner of device 400), to obtain a license for the content indicated by the manifest 406A from the DRM server 420. The license returned by the DRM server 420 to the application 404 indicates the digital rights in regard to the respective content for this client as determined by the DRM server 420. The license returned by the DRM server 420 may also include the content encryption key 412. The key 412 may be provided to and hosted by a local HTTP server 410. In at least some embodiments, application 404 may contain a local HTTP server 410. The manifest 406A is modified to generate a modified manifest 406B containing the localhost URL for obtaining the key 412 from local HTTP server 410. The application 404 may then provide the manifest 406B to the OS 402 (e.g., to a media player module of the OS 402); the manifest includes the localhost URL for obtaining the key 412 from local HTTP server 410. The OS 402 may then obtain the key 412 from local HTTP server 410 over HTTP using the localhost URL indicated in the manifest 406B. The OS 402 may then stream the content 432 indicated by the manifest file 406B from the content server 430, using the obtained key to locally decrypt the encrypted data in the stream received from content server 430. The OS 402 may, but does not necessarily, pass the streamed content 432 to the application.

Figure 10:
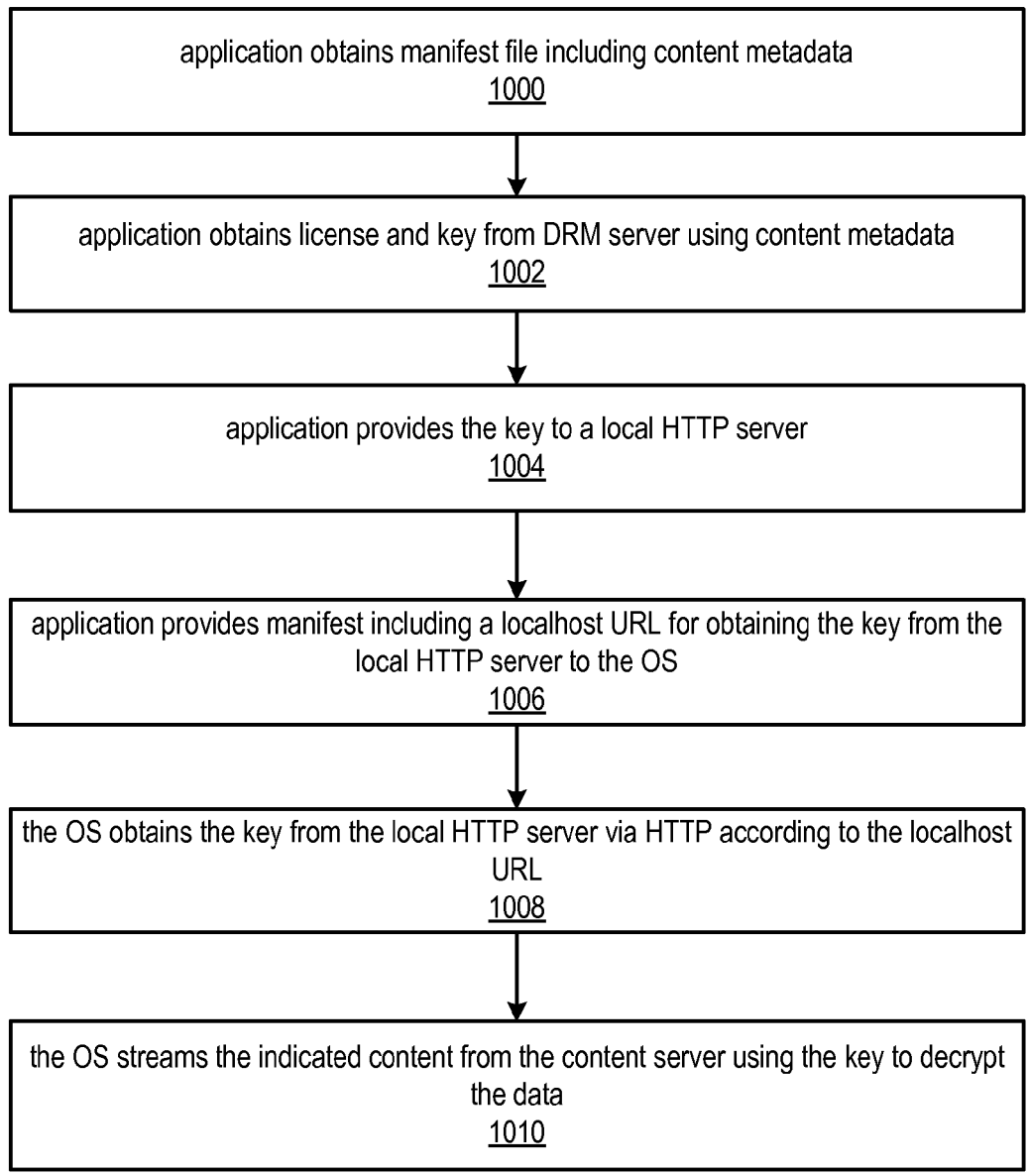
FIG. 10 is a flowchart of a method for integrating a DRM system with HTTP live streaming on an OS platform in which a localhost URL is used to direct the OS to a local HTTP server that looks up and returns the key via HTTP, according to at least some embodiments.

FIG. 10 is a flowchart of a method for integrating a DRM system with HTTP live streaming on an OS platform in which a localhost URL is used to direct the OS to a local HTTP server that looks up and returns the key via HTTP, according to at least some embodiments. As indicated at 1000, an application on a device configured according to an operating system (OS) platform such as Apple's iOS obtains a manifest file that includes content metadata. As indicated at 1002, the application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server may also include the content encryption key. As indicated at 1004, the key may be provided to a local HTTP server on the device. The manifest file is modified to contain the localhost URL of the local HTTP server for obtaining the key. As indicated at 1006, the application may then provide the manifest including the localhost URL for obtaining the key to the OS (e.g., to a media player module of the OS). As indicated at 1008, the OS obtains the key from the local HTTP server via HTTP according to the localhost URL in the manifest file. As indicated at 1010, the OS may then stream the content indicated by the manifest file from the content server, using the obtained key to locally decrypt the encrypted data in the stream received from content server. The OS may, but does not necessarily, pass the streamed content to the application.

Method Using Local HTTPS Server, HTTPS, and Localhost URLs

In this method, a localhost URL is used to direct the OS to an HTTPS server on the device on which the application resides; the local HTTPS server provides the key for decrypting data in the HTTP file stream to the OS via HTTPS. The HTTPS server may be bundled with the application or otherwise obtained and installed on the device. A manifest file (e.g., an M3U playlist) is obtained by the application from some source. A license and one or more keys for the indicated content are retrieved by the application according to metadata in the manifest file from a DRM server that enforces the digital rights of the client for the specified content. The key is provided to and hosted by the local HTTPS server. In some embodiments, the original manifest file may be modified to contain the localhost URL for obtaining the key. The manifest file is then passed to the OS, which uses the localhost URL to retrieve the key from the local HTTPS server. The key is delivered from the local HTTPS server to the OS over HTTPS.

Since the key is delivered to the OS over HTTPS from a trusted server, this method provides a relatively high level of security when compared to the other methods. The local HTTPS server uses a trustable certificate that the operating system (OS) of the device should trust. The credentials of the local HTTPS server may be effectively protected using one or more techniques. In at least some embodiments, the same credentials may be used by all instances of the application. These credentials are typically issued from a certificate provider and should be protected from attacks.

Figure 5:
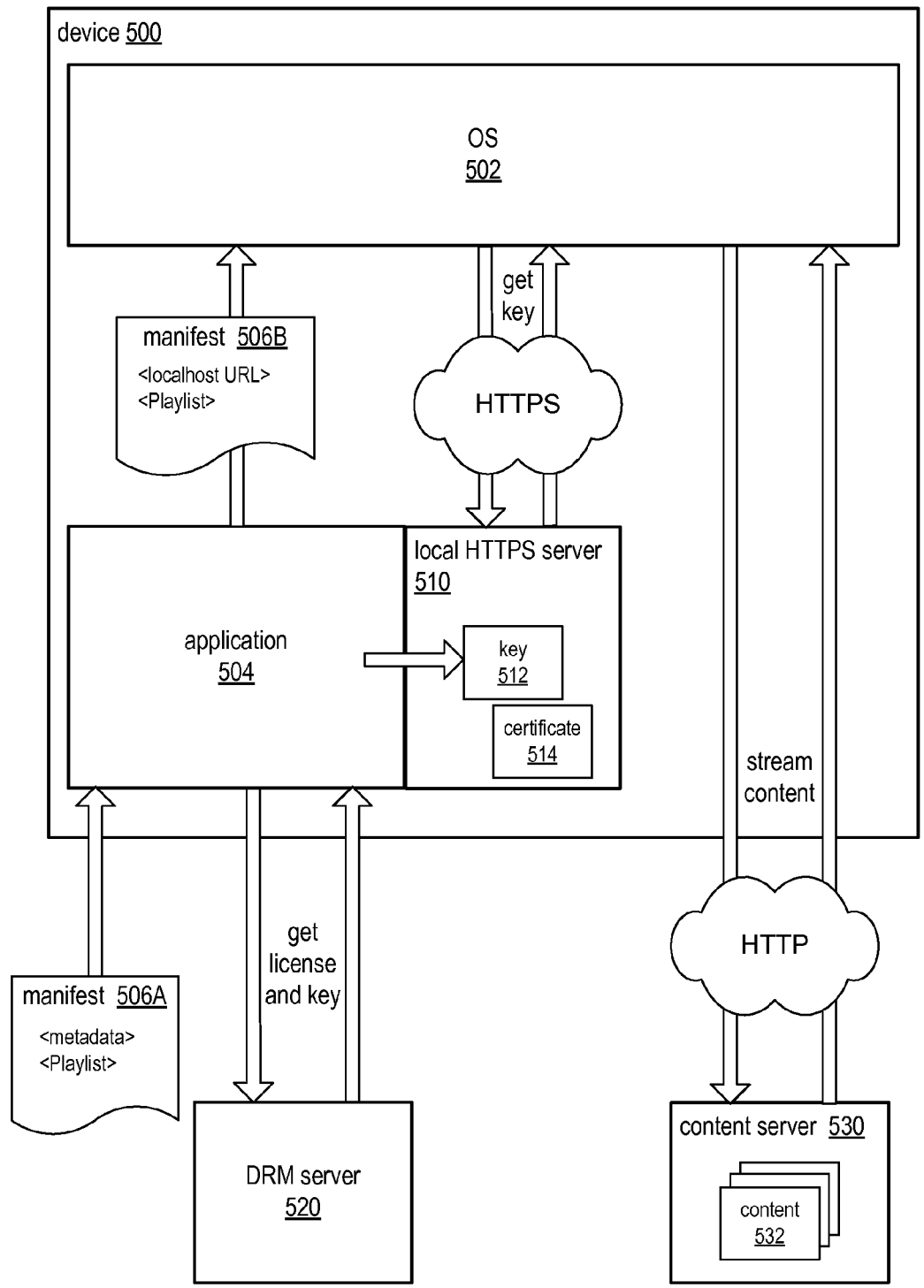
FIG. 5 illustrates data flow in a method for integrating a DRM system with HTTP live streaming on an OS platform in which a localhost URL is used to direct the OS to a local HTTPS server that looks up and returns the key via HTTPS, according to at least some embodiments.

FIG. 5 illustrates data flow in a method for integrating a DRM system with HTTP live streaming on an OS platform in which a localhost URL is used to direct the OS to a local HTTPS server that looks up and returns the key via HTTPS, according to at least some embodiments. An application 504 may be installed on a device 500 configured according to an operating system (OS) 502 platform such as Apple's iOS. The device 500 may be, but is not necessarily, a mobile device such as a smart phone or pad device. The application 504 may obtain a manifest 506A for some content, for example a content 532 hosted on a content server 430. Manifest 506A may contain content metadata for obtaining digital rights (e.g., a digital license) from a digital rights management (DRM) server 520. The application 504 may then use the metadata, along with identifying information for the particular client (e.g., the owner of device 500), to obtain a license for the content indicated by the manifest 506A from the DRM server 520. The license returned by the DRM server 520 to the application 504 indicates the digital rights in regard to the respective content for this client as determined by the DRM server 520. The license returned by the DRM server 520 may also include the content encryption key 512. The key 512 may be provided to and hosted by a local HTTPS server 510. In at least some embodiments, application 504 may contain a local HTTPS server 510. In some embodiments, the manifest 506A may be modified to generate a modified manifest 506B containing the localhost URL for obtaining the key 512 from local HTTPS server 510. The application 504 may then provide the manifest 506B to the OS 402 (e.g., to a media player module of the OS 502); the manifest 506B includes the localhost URL for obtaining the key 512 from local HTTPS server 510. The OS 502 may then obtain the key 512 from local HTTPS server 510 over HTTPS using the localhost URL indicated in the manifest 506B. The OS 502 may then stream the content 532 indicated by the manifest file 506B from the content server 530, using the obtained key 512 to locally decrypt the encrypted data in the stream received from content server 530. The OS 502 may, but does not necessarily, pass the streamed content 532 to the application.

Figure 11:
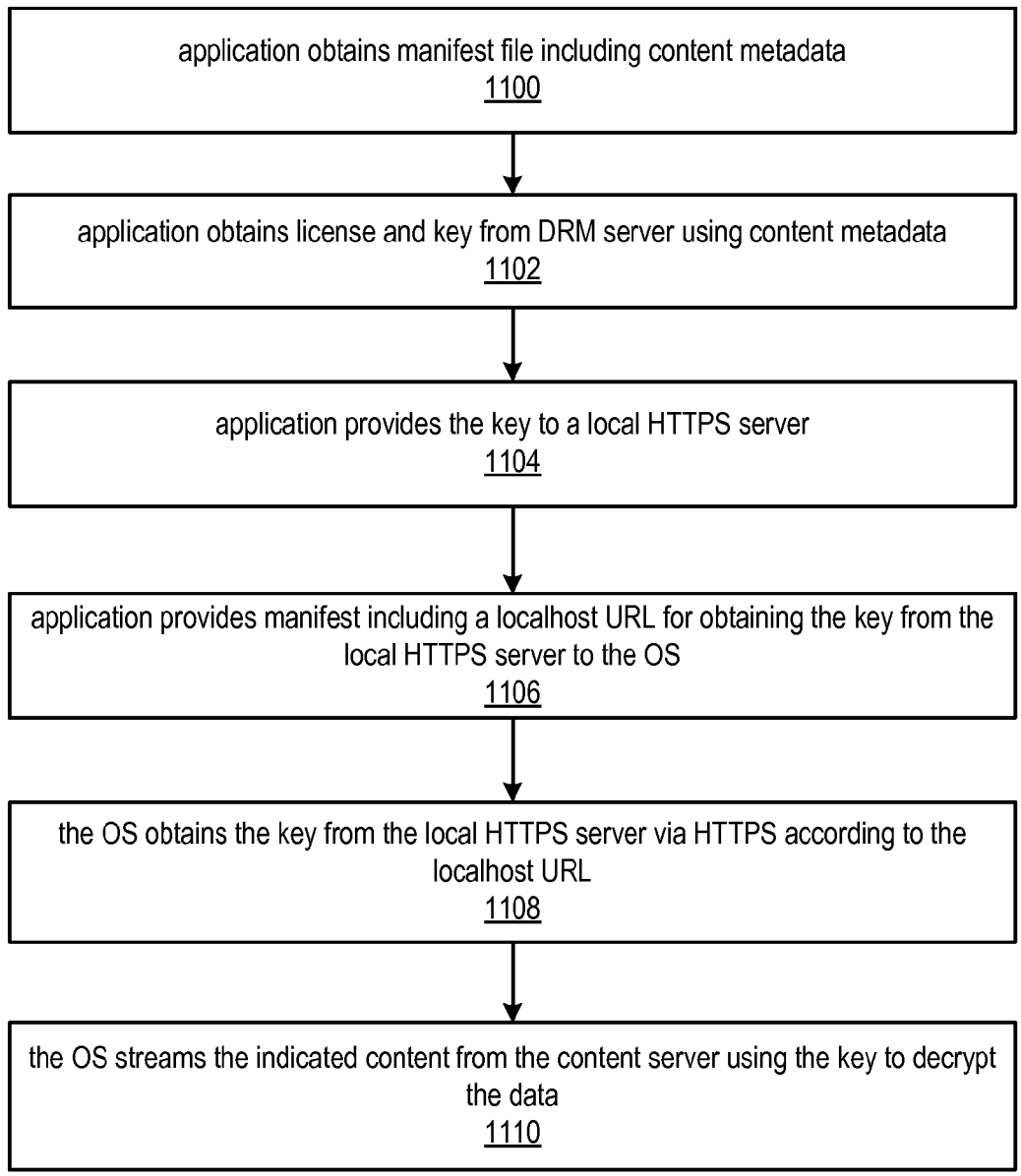
FIG. 11 is a flowchart of a method for integrating a DRM system with HTTP live streaming on an OS platform in which a localhost URL is used to direct the OS to a local HTTPS server that looks up and returns the key via HTTPS, according to at least some embodiments.

FIG. 11 is a flowchart of a method for integrating a DRM system with HTTP live streaming on an OS platform in which a localhost URL is used to direct the OS to a local HTTPS server that looks up and returns the key via HTTPS, according to at least some embodiments. As indicated at 1100, an application on a device configured according to an operating system (OS) platform such as Apple's iOS obtains a manifest file that includes content metadata. As indicated at 1102, the application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server may also include the content encryption key. As indicated at 1104, the key may be provided to a local HTTPS server on the device. In some embodiments, the manifest file may be modified to contain the localhost URL of the local HTTPS server for obtaining the key. As indicated at 1106, the application may then provide the manifest including the localhost URL for obtaining the key to the OS (e.g., to a media player module of the OS). As indicated at 1108, the OS obtains the key from the local HTTPS server via HTTPS according to the localhost URL in the manifest file. As indicated at 1110, the OS may then stream the content indicated by the manifest file from the content server, using the obtained key to locally decrypt the encrypted data in the stream received from content server. The OS may, but does not necessarily, pass the streamed content to the application.

Method Using Application-Defined URLs

In this method, an application-defined URL is used to direct the OS to a module or class that provides the key for decrypting data in an HTTP file stream. An application-defined URL type (for example, faxs://) may be registered with the OS by the application through a mechanism provided by the OS. For example, Apple's iOS may provide a mechanism that allows applications to register classes that use an application-defined URL (and a protocol). This mechanism may be leveraged in this method to provide the key to the OS via the application-defined URL.

In this method, a manifest file (e.g., an M3U playlist) is obtained by the application from some source. A license and one or more keys for the indicated content are retrieved by the application according to metadata in the manifest file from a DRM server that enforces the digital rights of the client for the specified content. The key may be locally stored, for example in a secure local data store or memory area accessible and visible only to the application on the device. In some embodiments, the manifest file may be modified to contain the application-defined URL (for example, faxs:// . . . ) for obtaining the key from the local data store. The manifest file is then passed to the OS, which uses the application-defined URL indicated in the manifest to retrieve the key from the module or class.

This method may provide a medium to high level of security when compared to the other methods.

Figure 6:
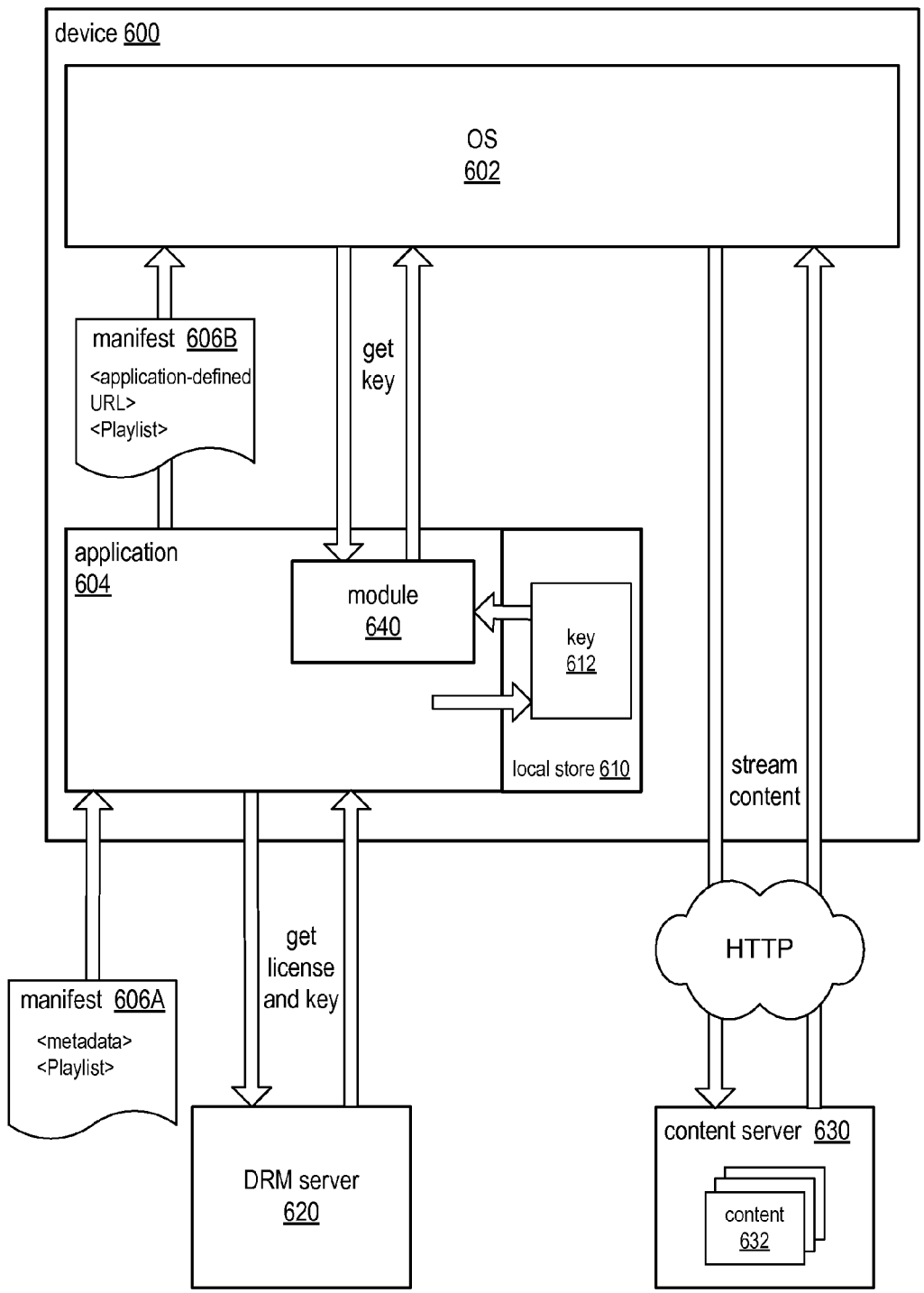
FIG. 6 illustrates data flow in a method for integrating a DRM system with HTTP live streaming on an OS platform in which an application-defined URL is used to direct the OS to a module that retrieves the key from a secure local store and returns the key, according to at least some embodiments.

FIG. 6 illustrates data flow in a method for integrating a DRM system with HTTP live streaming on an OS platform in which an application-defined URL is used to direct the OS to a module that retrieves the key from a secure local store and returns the key, according to at least some embodiments. An application 604 may be installed on a device 600 configured according to an operating system (OS) 602 platform such as Apple's iOS. The device 600 may be, but is not necessarily, a mobile device such as a smart phone or pad device. The application 604 may include a module or class (module 640) for which an application-defined URL is registered with the OS 602. The application 604 may obtain a manifest 606A for some content, for example a content 632 hosted on a content server 630. Manifest 606A may contain content metadata for obtaining digital rights (e.g., a digital license) from a digital rights management (DRM) server 620. The application 604 may then use the metadata, along with identifying information for the particular client (e.g., the owner of device 600), to obtain a license for the content indicated by the manifest 606A from the DRM server 620. The license returned by the DRM server 620 to the application 604 indicates the digital rights in regard to the respective content for this client as determined by the DRM server 620. The license returned by the DRM server 620 may also include the content encryption key 612. The key 612 may be locally stored, for example in a secure local data store 610 or memory area accessible and visible only to the application 604 on the device 600. In some embodiments, the manifest 606A may be modified to generate a modified manifest 606B containing the application-defined URL (for example, faxs:// . . . ) for module 640. The application 604 may then provide the manifest 606B to the OS 602 (e.g., to a media player module of the OS 602); the manifest 606B includes the application-defined URL for obtaining the key 612 from local store 610 via module 640. The OS 602 may then obtain the key 412 from local store 610 by using the application-defined URL indicated in the manifest 606B to contact module 640, which retrieves the key 612 from local store 610 and returns the key 612 to the OS 602. The OS 602 may then stream the content 632 indicated by the manifest file 606B from the content server 630, using the obtained key 612 to locally decrypt the encrypted data in the stream received from content server 630. The OS 602 may, but does not necessarily, pass the streamed content 632 to the application.

Figure 12:
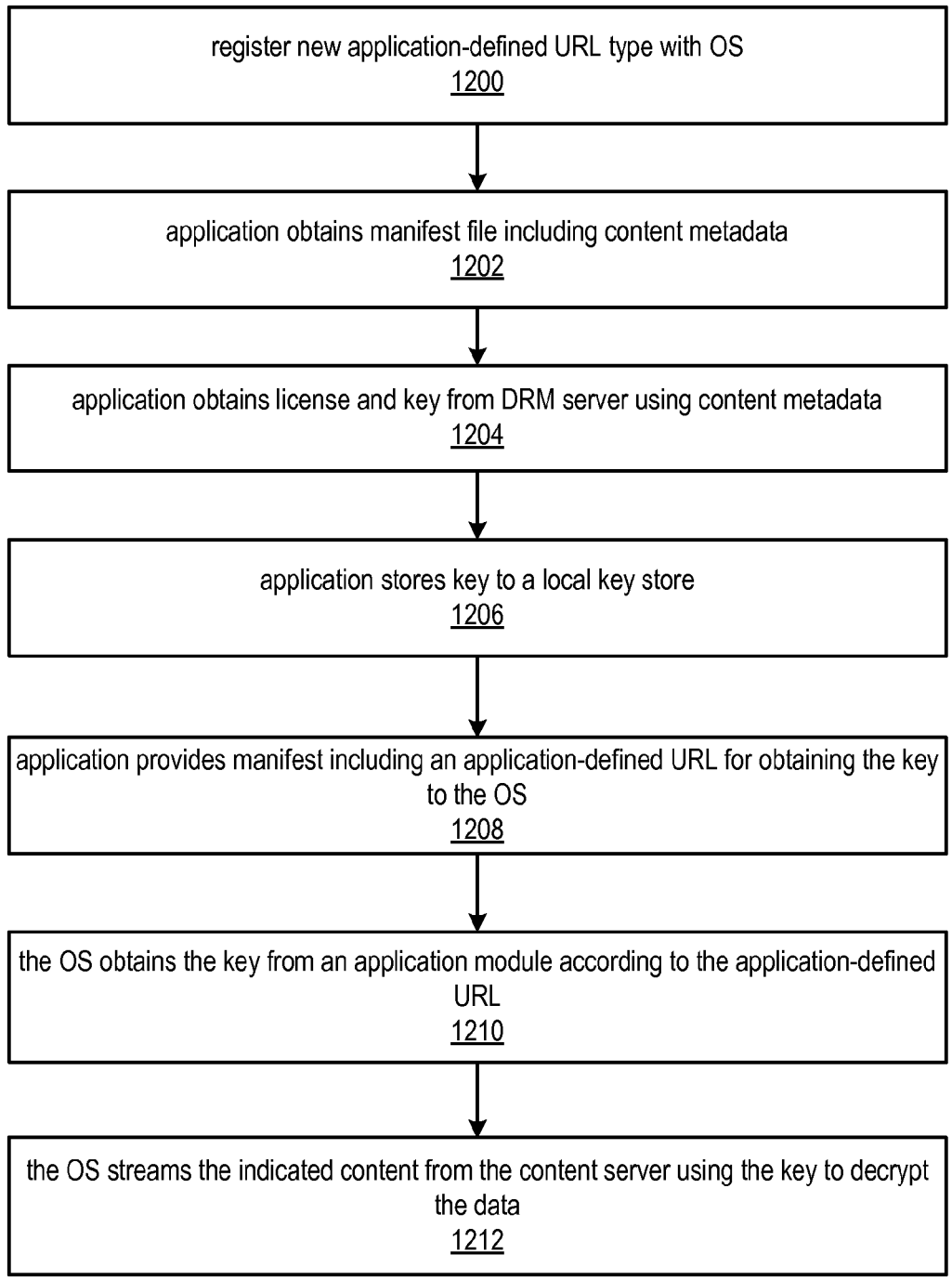
FIG. 12 is a flowchart of a method for integrating a DRM system with HTTP live streaming on an OS platform in which an application-defined URL is used to direct the OS to a module that retrieves the key from a secure local store and returns the key, according to at least some embodiments.

FIG. 12 is a flowchart of a method for integrating a DRM system with HTTP live streaming on an OS platform in which an application-defined URL is used to direct the OS to a module that retrieves the key from a secure local store and returns the key, according to at least some embodiments. As indicated at 1200, an application-defined URL (e.g., faxs://) for a class or module is registered with the OS platform. As indicated at 1202, an application on a device configured according to an operating system (OS) platform such as Apple's iOS obtains a manifest file that includes content metadata. As indicated at 1204, the application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server may also include the content encryption key. As indicated at 1206, the key may be stored to a secure local store on the device. In some embodiments, the manifest file may be modified to contain the application-defined URL for obtaining the key via a module or class for which the application-defined URL is registered. As indicated at 1208, the application may then provide the manifest including the application-defined URL for obtaining the key to the OS (e.g., to a media player module of the OS). As indicated at 1210, the OS obtains the key from the local store via the module according to the application-defined URL in the manifest file. As indicated at 1212, the OS may then stream the content indicated by the manifest file from the content server, using the obtained key to locally decrypt the encrypted data in the stream received from content server. The OS may, but does not necessarily, pass the streamed content to the application.

Method Using HTTPS Remote Service and Tokens

In this method, an HTTPS service is hosted on a remote trusted server, and a URL for the HTTPS service is passed to the OS by the application. Unlike conventional methods that use an HTTPS server, for example as illustrated in FIG. 1, the HTTPS service does not maintain a database of keys and perform a lookup to locate a key when requested by a client device. Instead, a signed token that includes an encrypted key is passed to the HTTPS service from the OS on the device that hosts the application via the URL (e.g., as a parameter of the URL). The HTTPS service verifies the signature, ensures that the request is from the right client using client identifying information, extracts and decrypts the key (e.g., using a private key or a shared symmetric key), and returns the key to the OS on the device that hosts the application.

In this method, a manifest file (e.g., an M3U playlist) is obtained by the application from some source. A license and token (e.g., an HTTPS token) for the indicated content are retrieved by the application according to metadata in the manifest file from a DRM server that enforces the digital rights of the client for the specified content. The token may include but is not limited to information about the client and an encrypted key. The application signs the token with a client signature. The original manifest file is modified to contain a URL for the HTTPS service on the remote server; the URL includes the signed token as a parameter. The following shows an example URL format that may be used, and is not intended to be limiting:

HTTPS://xx.yy?token=XXXX

The manifest file is then passed to the OS, which uses the URL to contact the HTTPS service on the remote server. The HTTPS service extracts the token from the URL, verifies that the signature of the client matches identifying information for the client in the token, and extracts and decrypts the encrypted key (e.g., using a private key or a shared symmetric key). The decrypted key is then returned to the OS over HTTPS.

In contrast to conventional methods as illustrated in FIG. 1 that use a remote HTTPS server that maintains a database of keys and performs lookups for keys when queried by clients, the only remotely hosted entity is the stateless HTTPS service that verifies, decrypts and delivers the key over HTTPS, and thus does not need to maintain a database of keys or perform key lookups. A stateless server or service may be broadly defined as a "sessionless" server or service that treats each request from a client as an independent transaction that is not related to any previous request. A stateless server or service does not need to allocate memory to handle transactions, and is not concerned about session maintenance such as timeouts.

This method may provide a relatively high level of security when compared to the other methods.

Figure 7:
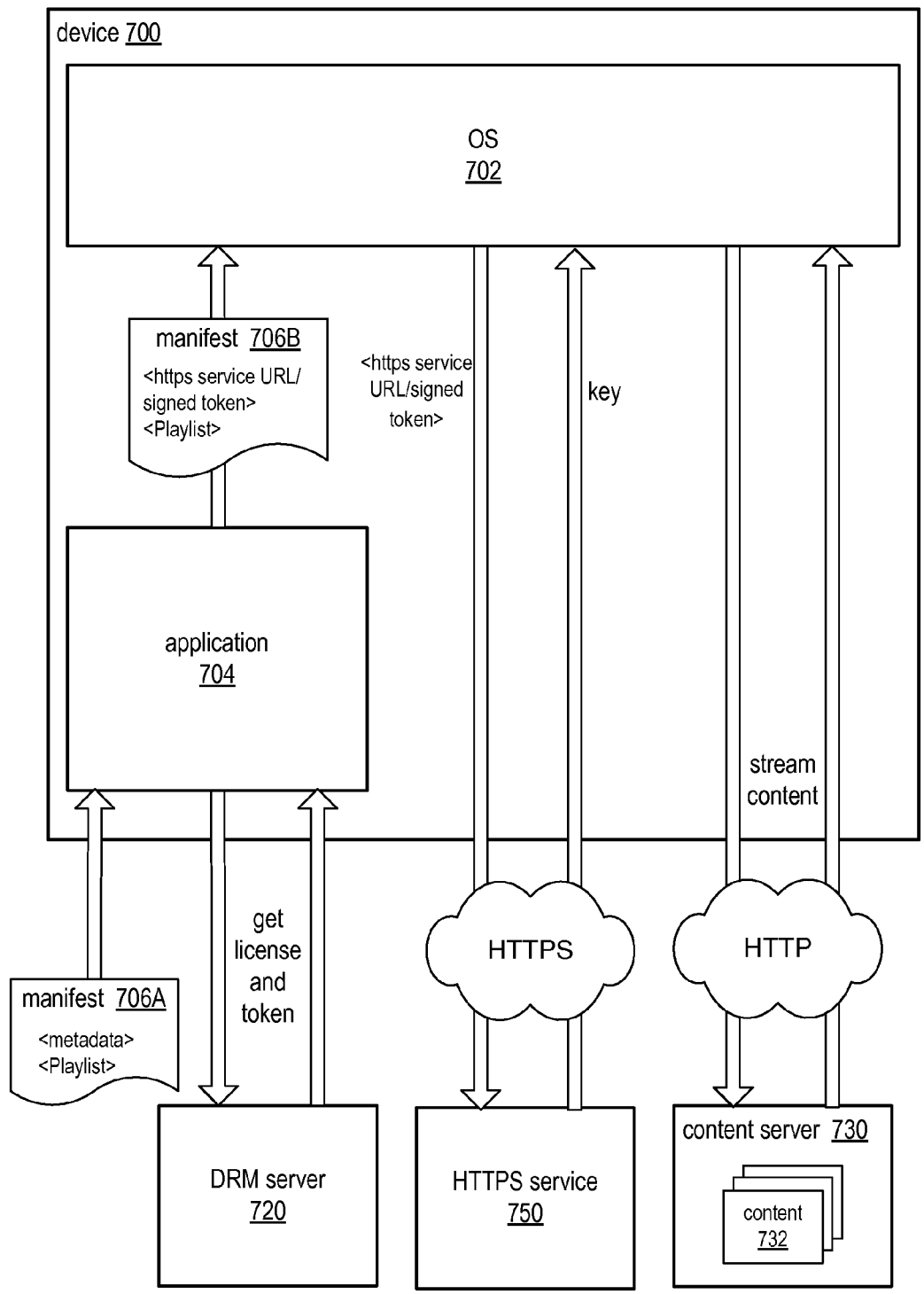
FIG. 7 illustrates data flow in a method for integrating a DRM system with HTTP live streaming on an OS platform in which an HTTPS service URL is used to direct the OS to a remote HTTPS service that extracts the encrypted key from the URL, decrypts the key, and returns the key to the OS via HTTPS, according to at least some embodiments.

FIG. 7 illustrates data flow in a method for integrating a DRM system with HTTP live streaming on an OS platform in which an HTTPS service URL is used to direct the OS to a remote HTTPS service that extracts the encrypted key from the URL, decrypts the key, and returns the key to the OS via HTTPS, according to at least some embodiments. An HTTPS service 750 is hosted on a remote trusted server, which may be but is not necessarily content server 730. In at least some embodiments, unlike conventional methods that use an HTTPS server, the HTTPS service 750 is a stateless service that does not maintain a database of keys and does not perform lookups to locate a key when requested by a client device.

An application 704 may be installed on a device 700 configured according to an operating system (OS) 702 platform such as Apple's iOS. The device 700 may be, but is not necessarily, a mobile device such as a smart phone or pad device. The application 704 may obtain a manifest 706A for some content, for example a content 732 hosted on a content server 730. Manifest 706A may contain content metadata for obtaining digital rights (e.g., a digital license) from a digital rights management (DRM) server 720. The application 704 may then use the metadata, along with identifying information for the particular client (e.g., the owner of device 700), to obtain a license for the content indicated by the manifest 706A from the DRM server 720. The license returned by the DRM server 720 to the application 704 indicates the digital rights in regard to the respective content for this client as determined by the DRM server 720. The license returned by the DRM server 720 may also include a token that includes at least information about the client and an encrypted key. The application may sign the token with a client digital signature. The original manifest 706A is modified to generate a modified manifest 706B containing a URL for the HTTPS service 750 that includes the at least the signed token as a parameter. The application 704 may then provide the manifest 706B to the OS 702 (e.g., to a media player module of the OS 702). The OS 702 may then use the URL indicated in the manifest 706B to contact the HTTPS service 750 on the remote server, for example using an HTTPS GET call. The HTTPS service 750 extracts the token from the URL, verifies that the signature of the client matches identifying information about the client in the token, and extracts and decrypts the encrypted key (e.g., using a private key or a shared symmetric key). The decrypted key is then returned to the OS 702 over HTTPS, for example in a response to an HTTPS GET call. The OS 702 may then stream the content 732 indicated by the manifest file 706B from the content server 730, using the obtained key 712 to locally decrypt the encrypted data in the stream received from content server 730. The OS 702 may, but does not necessarily, pass the streamed content 732 to the application.

Figure 13:
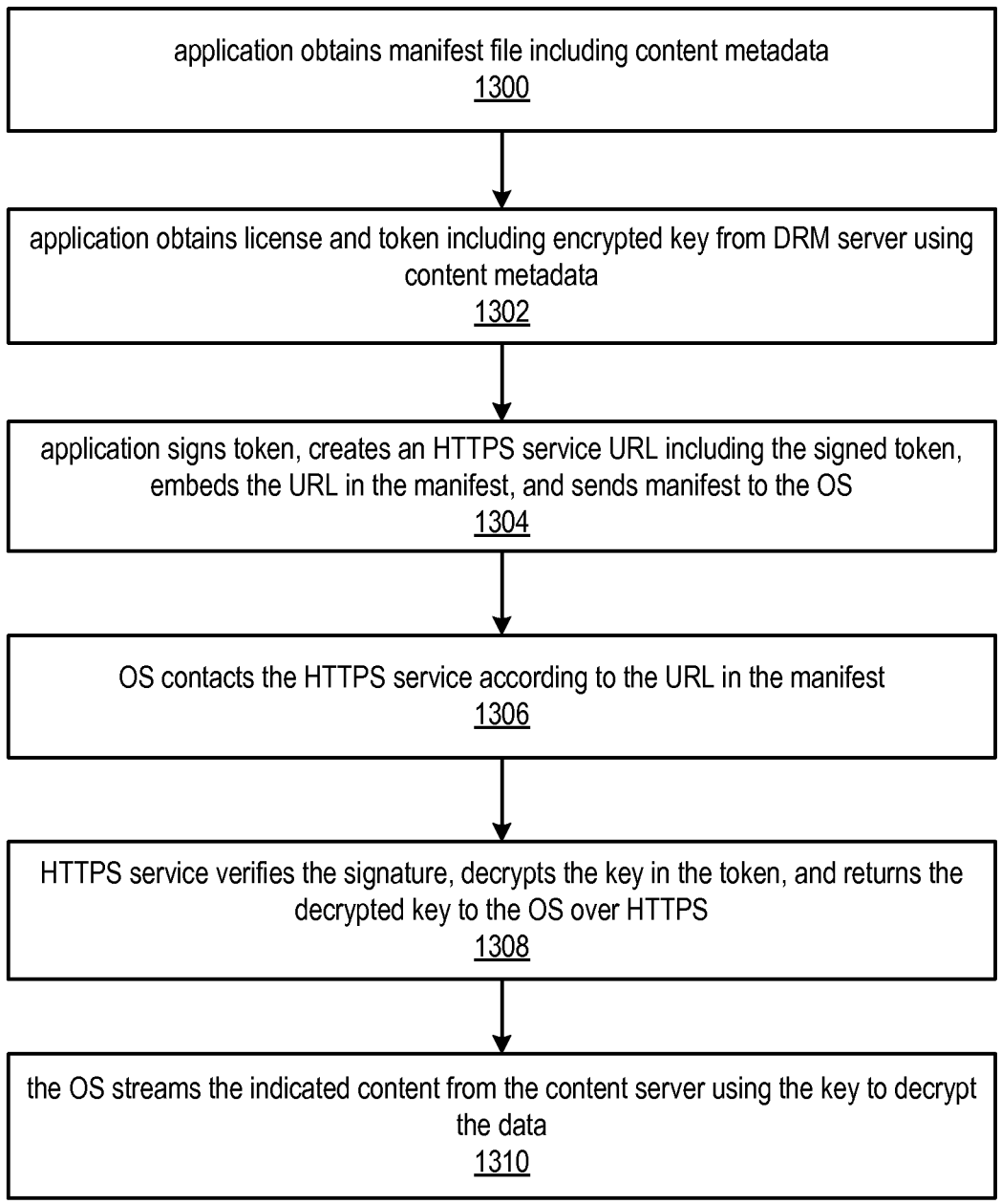
FIG. 13 is a flowchart of a method for integrating a DRM system with HTTP live streaming on an OS platform in which an HTTPS service URL is used to direct the OS to a remote HTTPS service that extracts the encrypted key from the URL, decrypts the key, and returns the key to the OS via HTTPS, according to at least some embodiments.

FIG. 13 is a flowchart of a method for integrating a DRM system with HTTP live streaming on an OS platform in which an HTTPS service URL is used to direct the OS to a remote HTTPS service that extracts the encrypted key from the URL, decrypts the key, and returns the key to the OS via HTTPS, according to at least some embodiments. As indicated at 1300, an application on a device configured according to an operating system (OS) platform such as Apple's iOS obtains a manifest file that includes content metadata. As indicated at 1302, the application obtains a license and one or more keys for content indicated by the manifest file from a digital rights management (DRM) server using the content metadata. The license returned by the DRM server to the application indicates the digital rights in regard to the respective content for this client as determined by the DRM server. The license returned by the DRM server may also include a token that includes at least information about the client and an encrypted key. As indicated at 1304, the application signs the token, creates an HTTPS service URL including the signed token as a parameter, embeds the URL in the manifest, and sends the manifest to the OS on the device (e.g., to a media player module of the OS). As indicated at 1306, the OS may then use the URL indicated in the manifest to contact the HTTPS service on a remote server, for example using an HTTPS GET call. As indicated at 1308, the HTTPS service extracts the signed token from the URL, verifies that the signature of the client matches identifying information for the client in the token, extracts and decrypts the encrypted key (e.g., using a private key or a shared symmetric key), and returns the decrypted key to the OS over HTTPS. As indicated at 1310, the OS may then stream the content indicated by the manifest file from the content server, using the obtained key to locally decrypt the encrypted data in the stream received from content server. The OS may, but does not necessarily, pass the streamed content to the application.

Handling Live Events

For live events, the manifest file contains the playlist of all of the published content URLs in sequence up to the current time (the time at which that manifest version is published). This manifest may be updated periodically or aperiodically as new content URLs (and the corresponding segments) become available. The OS (e.g., a media player module of the OS) may repeatedly request the manifest file using a manifest URL. In the above-described methods that use a local HTTP or HTTPS server, these requests may be intercepted by a local web server bundled in the application. The local web server fetches the manifest file from the remote server, modifies the manifest file to point the URL for obtaining the key to the local HTTP or HTTPS server, and provides the manifest file to the OS. In the method that uses a remote HTTPS service and tokens, there is no local web server. In this method, the application, instead of acting like a web server, can simply change the manifest URL itself to be an application defined URL, so that a corresponding application-defined class or module is called for the manifest requests. This class or module then fetches the most up-to-date manifest file from the remote server, modifies the URL to add the signed token, and provides it to the OS (e.g., to a media player module of the OS).

A similar technique may be used for the above-described method that uses a file URL. However, note that modifying the key URL is optional in the method that uses an application-defined URL.

Key Delivery Mechanism for HTTP Live Streaming

Embodiments of methods and apparatus for delivering keys for HTTP live streaming are described. These methods do not require an HTTPS server to maintain a database of keys and do not require the server to do lookups on keys when queried by clients. Using a conventional method for key delivery that uses a remote HTTP server that maintains a database to store keys and performs lookups for a key during an HTTP streaming session may be cumbersome and expensive, and may cause scalability issues at the streaming server. Embodiments of the key delivery mechanism provide a method to deliver keys to the OS platform (e.g., iOS platform) devices for decrypting encrypted HTTP live streaming data that does not require a database or database lookups, and that thus may be less cumbersome and less expensive, and more scalable, than conventional methods. Note that the key delivery mechanism does not integrate digital rights management (DRM) with native HTTP live streaming, as do the methods previously described. Embodiments of the no-lookup key delivery mechanism optimize key delivery on the streaming server while delivering keys to OS platform (e.g., iOS platform) devices via HTTPS. An advantage provided by the key delivery mechanism is the scalability achieved due to the simplicity of the database-less, no-lookup method for providing keys for decrypting HTTP live streams. In addition, the key delivery mechanism does not require special handling by the applications on the OS platform device and thus work seamlessly with the OS platform.

Embodiments of the key delivery mechanism may use a stateless HTTPS service similar to the service described in the section titled Method using HTTPS remote service and tokens. However, in the key delivery mechanism, the manifest file (e.g., an M3U playlist) for an encrypted HTTP live stream obtained by an application (e.g., a browser application) on the OS platform device includes an HTTPS URL for the HTTPS service; the URL includes the encrypted key, for example as a query parameter value. The following shows an example URL format that may be used, and is not intended to be limiting:

HTTPS://xx.yy?encrypted_key=XXXX

The application may pass the manifest file, with the URL as is, to the OS. The OS platform device contacts the HTTPS service to obtain the key using the URL indicated in the manifest file. Since the encrypted key is a parameter of the URL, the encrypted key is provided to the HTTPS service along with information identifying the content. In at least some embodiments, the key is encrypted using the public key of the HTTPS service. Alternatively, the key may be encrypted with a shared symmetric key that is available at the HTTPS service. The HTTPS service decrypts the encrypted key passed as a parameter in the URL and returns the decrypted key over HTTPS, thus eliminating the need for a database look-up or other look-up at the HTTPS service for a key based on the content information.

As previously noted, embodiments of the key delivery mechanism may use a stateless HTTPS service similar to the service described in the section titled Method using HTTPS remote service and tokens. However, since this mechanism does not integrate DRM systems with HTTP live streaming, and since the manifest file delivered to the application includes the URL to the HTTPS service and the included URL includes the encrypted key as a parameter, and the URL is passed to the OS unaltered, this method does not require any specialized handling at the application or embedded servers on the device, as do the various methods for integrating DRM systems with native HTTP live streaming previously described.

In addition, the key delivery mechanism may not prevent another OS platform device with the same HTTPS client certificate from obtaining the key. In contrast, in the method described in the section titled Method using HTTPS remote service and tokens, OS platform devices are individualized; the HTTPS token is specific to the client and is verified by the HTTPS service. In the key delivery mechanism, authorization and authentication, if performed, is handled at the application level, for example using a username and password, with little if any device binding Furthermore, at least some of the methods for integrating DRM with HTTP live streaming can be used for offline use cases, and the methods are generally scalable especially when used for global access. In contrast, the key delivery mechanism may require an HTTPS connection for every playback. In short, the key delivery mechanism is primarily directed to streaming use cases, while the methods for integrating DRM with HTTP live streaming are primarily directed to providing DRM.

Figure 14:
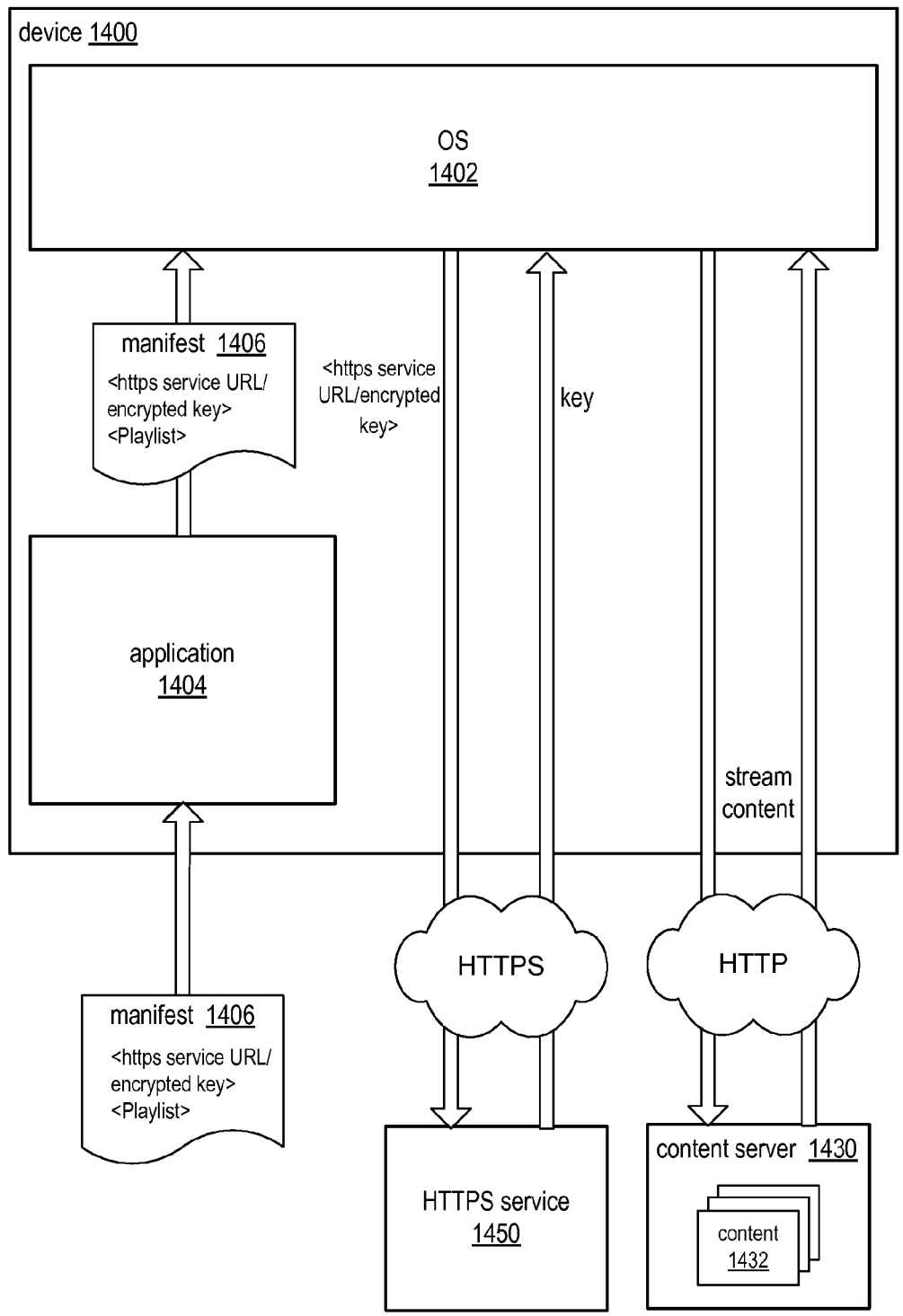
FIG. 14 illustrates data flow in a key delivery mechanism for HTTP live streaming on an OS platform such as the iOS platform, according to at least some embodiments.

FIG. 14 illustrates data flow in a key delivery mechanism for HTTP live streaming on an OS platform such as the iOS platform, according to at least some embodiments. An HTTPS service 1450 may be hosted on a remote trusted server, which may be but is not necessarily content server 1430. In at least some embodiments, unlike conventional methods that use an HTTPS server, the HTTPS service 1450 is a stateless service that does not maintain a database of keys and does not perform lookups to locate a key when requested by a client device. The stateless HTTPS service 1450 may publish a URL for contacting the service. A content server 1430 (e.g., a Flash Media Server) may support delivering encrypted video streams (content 1432) to OS platform (e.g., iOS platform) devices using an HTTP live streaming protocol (e.g., Apple's HLS protocol) even without using a DRM system such as Flash Access on the client side. A URL for obtaining a key for decrypting a data stream (the HTTPS service URL) is delivered to the client (application 1404) in the manifest file 1406 (e.g., an M3U playlist) that also indicates the content 1432. However, unlike conventional methods, an encrypted key is included as a parameter of the URL. The application 1404 (e.g., a browser application) passes the manifest file 1406 to the OS 1402 (e.g., to a media player module of the OS 1402). The OS 1402 uses the HTTPS service URL to acquire the content encryption key from the HTTPS service 1450. The HTTPS service 1450 decrypts the encrypted key passed as a parameter of the URL, and returns the decrypted key to the OS 1402 via HTTPS. The content server 1432 encrypts and streams content 1432 to device 1400 over HTTP according to HTTP live streaming guidelines of the OS platform. The device 1400 uses the key obtained from HTTPS service 1450 to decrypt the data in the stream.

Figure 15:
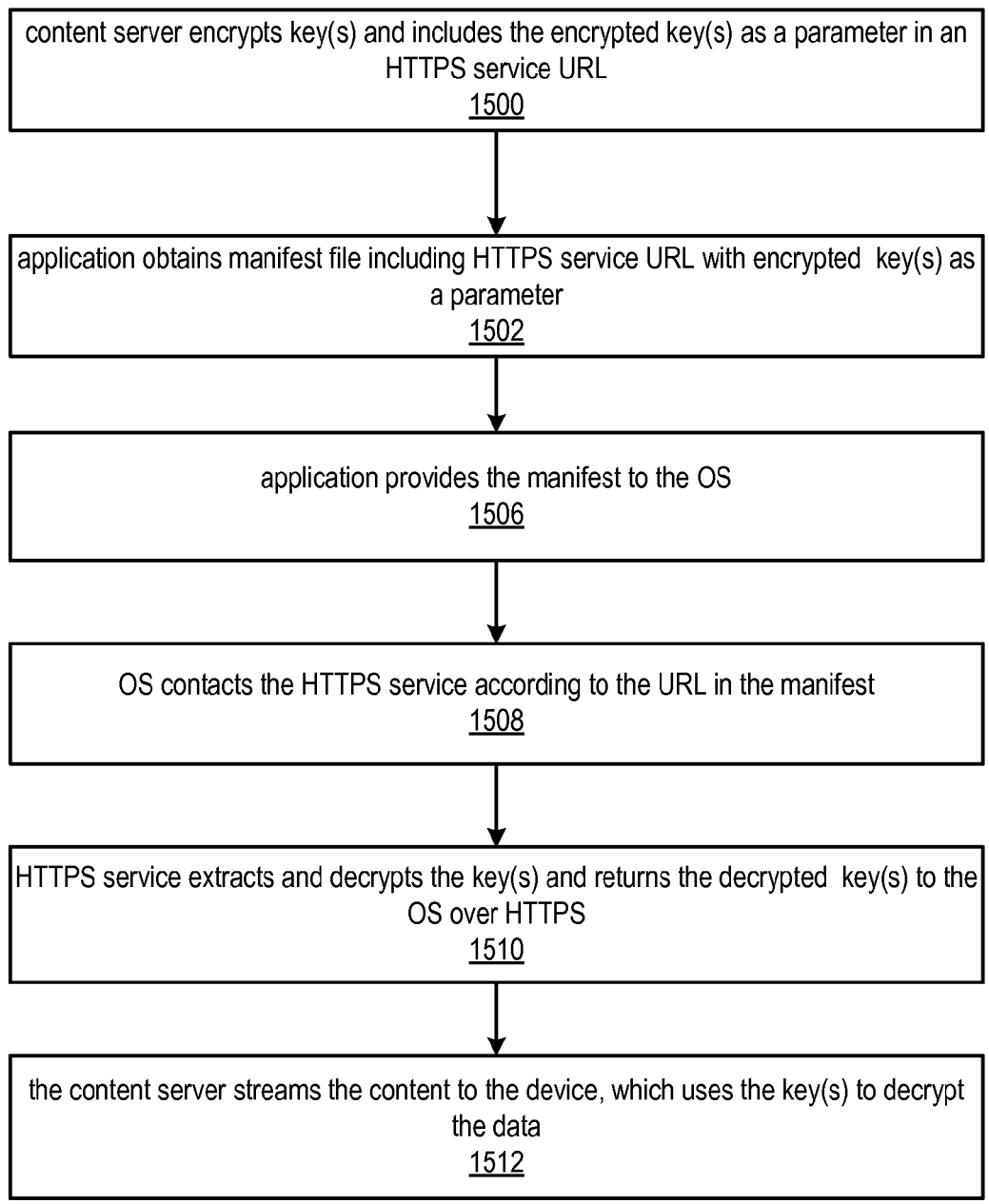
FIG. 15 is a flowchart of a method for key delivery for HTTP live streaming on an OS platform such as the iOS platform, according to at least some embodiments.

FIG. 15 is a flowchart of a method for key delivery for HTTP live streaming on an OS platform such as the iOS platform, according to at least some embodiments. As indicated at 1500, a content server encrypts a key or keys for decrypting data in an HTTP live stream and includes the encrypted key as a parameter in an HTTPS service URL. The key(s) may be encrypted either using a public key of an HTTPS service or using a shared symmetric key. The HTTPS service may be, but is not necessarily, hosted by the content server. The HTTPS service URL is included in a manifest file for the content to be streamed. As indicated at 1502, an application on an OS platform device (e.g., a browser application) obtains the manifest file including the HTTPS service URL with the encrypted key(s) as a parameter. The application may, but does not necessarily, obtain the manifest file from the content server.

As an example of how a manifest file may be obtained, a link to a live stream may be displayed on a web page. A user may access the web page via a browser or other application on the OS platform device and select the link. The web page may, but does not necessarily, require the user to log in with a user name and password to access the page. Selecting the link may result in the manifest file being delivered to the device.

As indicated at 1506, after the application obtains the manifest file, the application may provide the manifest file to the OS on the device (e.g., to a media player module of the OS). Note that the application does not modify the manifest file to include a source URL for obtaining a key, as the URL for obtaining the key is already in the manifest file.

As indicated at 1508, the OS contacts the HTTPS service according to the URL in the manifest to obtain the key, for example using an HTTPS GET. The query parameters of the URL, including the encrypted keys(s) are thus passed to the HTTPS service.

As indicated at 1510, the HTTPS service extracts and decrypts the key(s) and returns the decrypted key(s) to the OS on the device over HTTPS. In at least some embodiments, the HTTPS service parses the query parameter value, authenticates the request (if necessary by appropriate means), validates the request using a Secure Socket Layer (SSL) client certificate to ensure it is an OS platform device, and decrypts the key either using its private key or the shared symmetric key, and delivers the key to the OS platform device as the HTTPS GET response. In at least some embodiments, one or more additional parameters such as an indication of the encryption scheme used to encrypt the key and/or an indication of a need for authentication may be conveyed as additional parameters in the URL.

As indicated at 1512, the content server then streams the content to the device, which uses the key(s) obtained from the HTTPS service via the key delivery mechanism to decrypt the data.

Using this method, in at least some embodiments, the HTTPS service may be totally stateless to enable better scalability than is provided using conventional techniques, for example the technique illustrated in FIG. 1.

Example Implementations

Some embodiments may include a means for integrating a DRM system with HTTP live streaming on an OS platform. For example, an application module on an OS platform device may receive as input a manifest file including playlist content and metadata, access a DRM server according to the metadata to obtain license and key information for the content, modify the manifest file to indicate a URL for retrieving a key for the content, and pass the modified manifest file to an operating system (OS) function or module on the device, as described herein. The application module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving as input a manifest file including playlist content and metadata, access a DRM server according to the metadata to obtain license and key information for the content, modify the manifest file to indicate a URL for retrieving a key for the content, and pass the modified manifest file to an operating system (OS) function or module on the device, as described herein. Other embodiments of the application module may be at least partially implemented by hardware circuitry and/or firmware stored, for example, in a nonvolatile memory.

Figure 16:
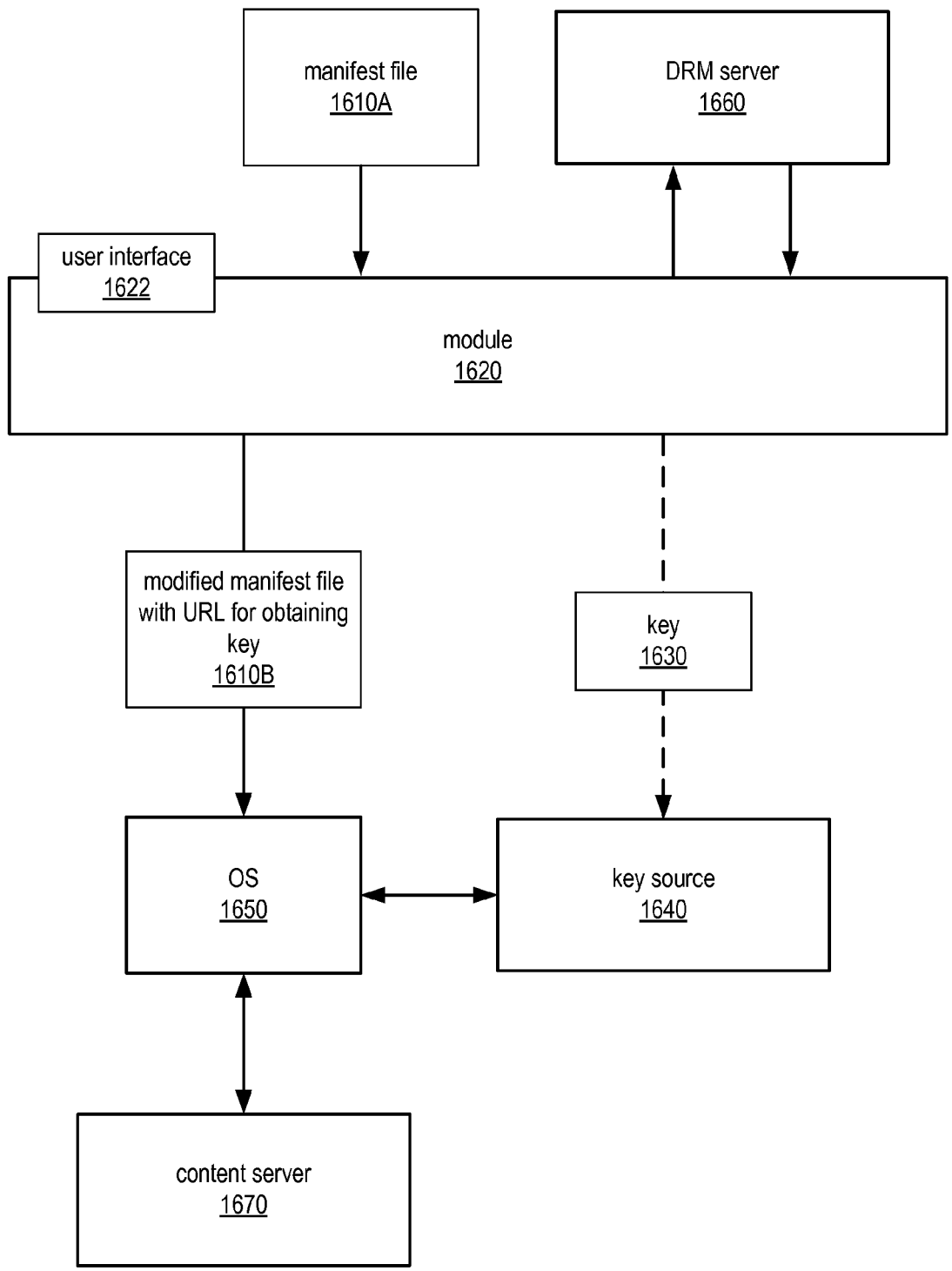
FIG. 16 illustrates a module that may implement at least a portion of a method for integrating a DRM system with HTTP live streaming on an OS platform device, according to at least some embodiments.
Figure 18:
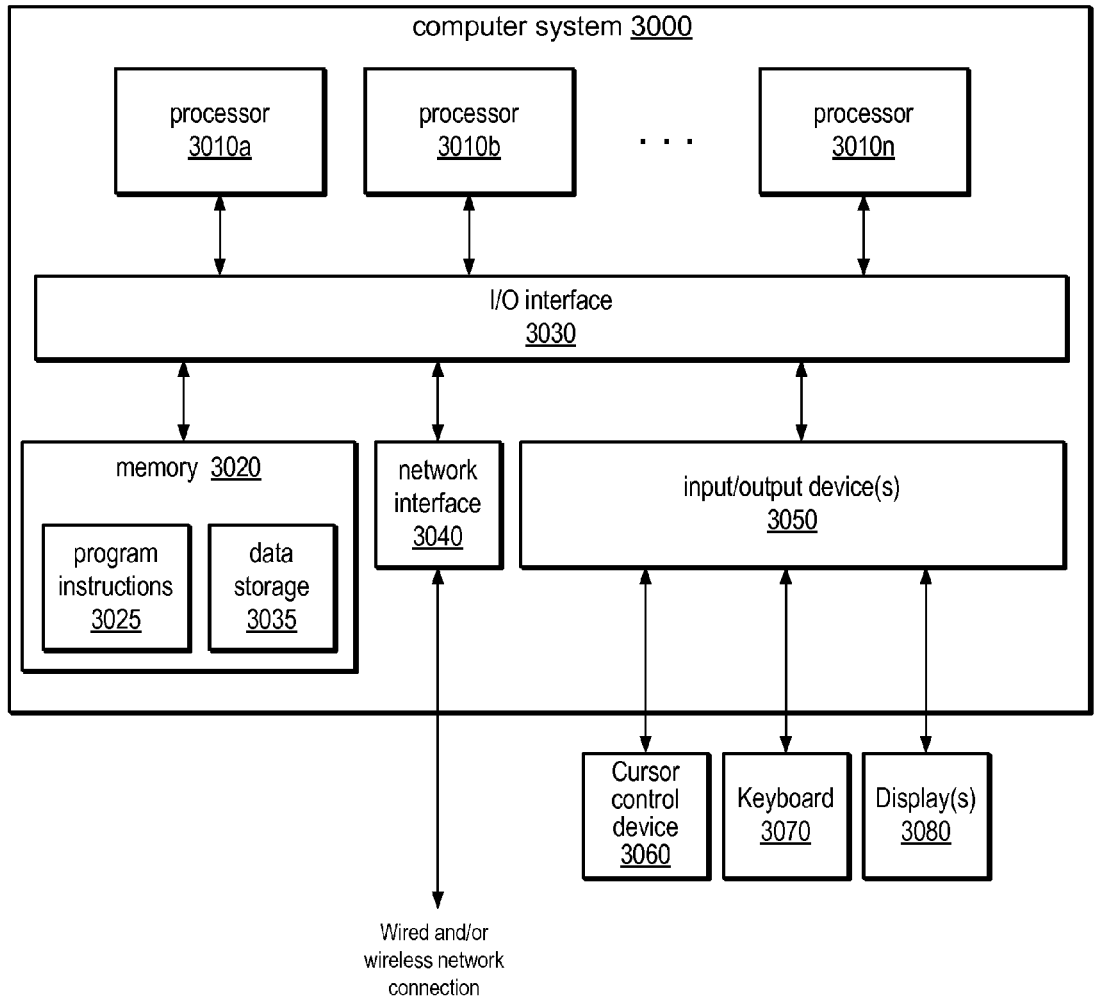
FIG. 18 illustrates an example computer system that may be used in embodiments.

FIG. 16 illustrates a module that may implement at least a portion of the methods for integrating a DRM system with HTTP live streaming on an OS platform as illustrated in FIGS. 2 through 13. Module 1620 may, for example, implement one or more of a method in which a file URL is used to direct the OS to a locally stored file that contains the key, a method in which a localhost URL is used to direct the OS to a local (on the device) HTTP server that looks up and returns the key via HTTP, a method in which a localhost URL is used to direct the OS to a local HTTPS server that looks up and returns the key via HTTPS, a method in which an application-defined URL is used to direct the OS to a module that retrieves the key from a secure local store and returns the key, and a method in which an HTTPS service URL is used to direct the OS to a stateless remote HTTPS service that extracts, decrypts, and returns a key included as a parameter in the URL to the OS. FIG. 18 illustrates an example computer system on which embodiments of module 1620 may be implemented. Module 1620 may receive as input a manifest file 1610A including playlist content and metadata, access a DRM server 1660 according to the metadata to obtain license and key information for the content, modify the manifest file 1610A to generate a modified manifest file 1610B including a URL for retrieving a key for the content from a key source 1640, and pass the modified manifest file 1610B to an operating system (OS) function or module 1650 on the device. The OS 1650 may then obtain the key from the key source 1640 according to the URL information included in the manifest file 1610B and stream the content indicated by the manifest file 1610B from a content server 1670, using the obtained key to locally decrypt the encrypted data in the stream received from content server 1670. The OS may, but does not necessarily, pass the streamed content to the module 1620.

In some embodiments, module 1620 may store or provide the key received from the DRM server 1660 to a key source 1640, for example an application file are or data store area, or a local host on the device such as a local HTTP or HTTPS server.

In some embodiments, module 1620 may include or provide a user interface 1622 via which a user may interact with the module 1620, for example to select or specify content to be streamed to the device according to the HTTP live streaming technology. The user interface 1622 may also be used to display content streamed to the device according to one of the methods described herein.

Some embodiments may include a means for extracting an encrypted key from a URL, decrypting the key, and returning the key to an OS platform. For example, a module (e.g., and HTTPS service) on a server device may receive as input a URL including an encrypted key, as described herein. In some embodiments, the encrypted key may be embedded in a signed token included as a parameter of the URL. In other embodiments, the encrypted key may be included as a parameter of the URL. The module may extract the encrypted key from the URL, decrypt the key (e.g., using a private key or a shared symmetric key), and return the decrypted key to the caller via HTTPS. The module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform at least receiving as input a URL including an encrypted key, extracting the encrypted key from the URL, decrypting the key, and returning the decrypted key to the caller via HTTPS, as described herein. Other embodiments of the module may be at least partially implemented by hardware circuitry and/or firmware stored, for example, in a nonvolatile memory.

Figure 17:
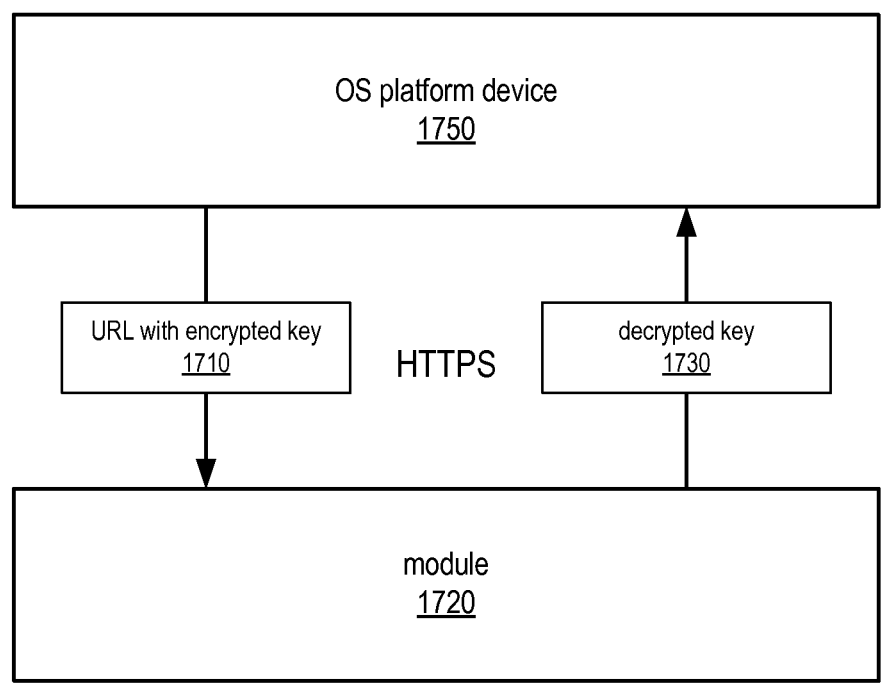
FIG. 17 illustrates a module that may implement a method that extracts an encrypted key from a URL, decrypts the key, and returns the key to an OS platform device via HTTPS, according to at least some embodiments.

FIG. 17 illustrates a module that may implement a method that extracts an encrypted key from a URL, decrypts the key, and returns the key to an OS platform device via HTTPS, according to at least some embodiments. For example, the module may be an HTTPS service as illustrated in FIGS. 7 and 14. FIG. 18 illustrates an example computer system on which embodiments of module 1720 may be implemented. Module 1720 may receive as input a URL 1710 including an encrypted key. In some embodiments, the encrypted key may be embedded in a signed token included as a parameter of the URL 1710. In other embodiments, the encrypted key may be included as a parameter of the URL 1710. URL 1710 may, for example, be received as or in an HTTP GET call from an OS platform device 1750. The module 1720 may extract the encrypted key from the URL 1710, decrypt the key (e.g., using a private key or a shared symmetric key), and return the decrypted key 1730 to the caller via HTTPS, for example to OS platform device 1750.

Example System

Embodiments of the methods for integrating a DRM system with HTTP live streaming and/or of the key delivery mechanism for HTTP live streaming as described herein may be executed on one or more computer systems, which may interact with various other devices. One such computer system is illustrated by FIG. 18. In different embodiments, computer system 3000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 3000 includes one or more processors 3010 coupled to a system memory 3020 via an input/output (I/O) interface 3030. Computer system 3000 further includes a network interface 3040 coupled to I/O interface 3030, and one or more input/output devices 3050, such as cursor control device 3060, keyboard 3070, and display(s) 3080. In some embodiments, display(s) 3080 may be touch- or multitouch-enabled. In some embodiments of computer system 3000, it is contemplated that embodiments may be implemented using a single instance of computer system 3000, while in other embodiments multiple such systems, or multiple nodes making up computer system 3000, may be configured to host different portions or instances of embodiments. For example, in one embodiment some elements may be implemented via one or more nodes of computer system 3000 that are distinct from those nodes implementing other elements.

In various embodiments, computer system 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

In some embodiments, at least one processor 3010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 3020 may be configured to store program instructions and/or data accessible by processor 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the methods for integrating a DRM system with HTTP live streaming and/or of the key delivery mechanism for HTTP live streaming, are shown stored within system memory 3020 as program instructions 3025 and data storage 3035, respectively. In other embodiments, program instructions and/or data may be received, sent or stored upon different types of computer-accessible media or on similar media separate from system memory 3020 or computer system 3000. Generally speaking, a computer-accessible medium may include storage media or memory media such as magnetic or optical media, e.g., disk or CD/DVD-ROM coupled to computer system 3000 via I/O interface 3030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 3040.

In one embodiment, I/O interface 3030 may be configured to coordinate I/O traffic between processor 3010, system memory 3020, and any peripheral devices in the device, including network interface 3040 or other peripheral interfaces, such as input/output devices 3050. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In addition, in some embodiments some or all of the functionality of I/O interface 3030, such as an interface to system memory 3020, may be incorporated directly into processor 3010.

Network interface 3040 may be configured to allow data to be exchanged between computer system 3000 and other devices attached to a network, such as other computer systems, or between nodes of computer system 3000. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3050 may, in some embodiments, include one or more display terminals, keyboards, keypads, touchpads, scanning devices, voice or optical recognition devices, or any other devices suitable for entering or retrieving data by one or more computer system 3000. Multiple input/output devices 3050 may be present in computer system 3000 or may be distributed on various nodes of computer system 3000. In some embodiments, similar input/output devices may be separate from computer system 3000 and may interact with one or more nodes of computer system 3000 through a wired or wireless connection, such as over network interface 3040.

As shown in FIG. 18, memory 3020 may include program instructions 3025, configured to implement embodiments of the methods for integrating a DRM system with HTTP live streaming and/or of the key delivery mechanism for HTTP live streaming as described herein, and data storage 3035, comprising various data accessible by program instructions 3025. In one embodiment, program instructions 3025 may include software elements of embodiments of the methods for integrating a DRM system with HTTP live streaming and/or of the key delivery mechanism for HTTP live streaming as illustrated in the above Figures. Data storage 3035 may include data that may be used in embodiments. In other embodiments, other or different software elements and data may be included.

Those skilled in the art will appreciate that computer system 3000 is merely illustrative and is not intended to limit the scope of the methods for integrating a DRM system with HTTP live streaming and/or of the key delivery mechanism for HTTP live streaming as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, smart phones, pad devices, tablet devices, pagers, a consumer device, video game console, handheld video game device, application server, storage device, a peripheral device such as a switch, modem, router, or in general any type of computing or electronic device. Computer system 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3000 may be transmitted to computer system 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method performed by an application implemented on a device configured according to an operating system (OS) platform, comprising:
   obtaining a manifest file, the manifest file indicating content to be streamed to the device from a content server according to an HTTP (Hypertext Transfer Protocol) live streaming (HLS) protocol supported by the OS platform and further indicating metadata for the content, the metadata not identifying a key for decrypting the content;
   accessing a digital rights management (DRM) server according to the metadata in the manifest to obtain a license for the content and a key for decrypting the content;
   modifying the manifest file to include a Uniform Resource Locator (URL) for obtaining the key according to information received from the DRM server; and
   providing the modified manifest file to an OS platform module, the OS platform module obtaining the key according to the URL indicated in the modified manifest file, obtaining a data stream of the indicated content from the content server, and decrypting data in the stream according to the obtained key.

2. The method as recited in claim 1, further comprising the application locally storing the key in a file in a file storage area of the application, wherein the URL for obtaining the key is a file URL for the file that includes the key, and wherein the OS platform module obtains the key from the file according to the file URL.

3. The method as recited in claim 1, further comprising the application providing the key to a local HTTP server implemented on the device, wherein the URL for obtaining the key is a localhost URL for the local HTTP server that hosts the key, and wherein the OS platform module obtains the key from the local HTTP server according to the localhost URL via HTTP.

4. The method as recited in claim 1, further comprising the application providing the key to a local HTTPS (Hypertext Transfer Protocol Secure) server implemented on the device, wherein the URL for obtaining the key is a localhost URL for the local HTTPS server that hosts the key, and wherein the OS platform module obtains the key from the local HTTPS server according to the localhost URL via HTTPS.

5. The method as recited in claim 1, further comprising the application locally storing the key in a secure local store of the application, wherein the URL for obtaining the key is an application-defined URL for a module of the application, wherein the module of the application is configured to access the key from the secure local store, and wherein the OS platform module obtains the key from the module of the application according to the application-defined URL.

6. The method as recited in claim 1, wherein the key obtained from the DRM server is obtained as an encrypted key included in a token, wherein the URL for obtaining the key is a URL for a remote HTTPS (Hypertext Transfer Protocol Secure) service, wherein the token is included as a token parameter of the URL included in the manifest file, and wherein the OS platform module obtaining the key according to the URL comprises:
   the OS platform module contacting the remote HTTPS service according to the URL; and
   the remote HTTPS service decrypting the encrypted key included in the token parameter and returning the decrypted key to the OS platform module via HTTPS.

7. The method as recited in claim 6, wherein the application signs the token with a client signature, and wherein the remote HTTPS service verifies that the signature of the token matches identifying information for the client in the token.

8. The method as recited in claim 1, wherein the OS platform module is a media player module.

9. A device, comprising:
   at least one processor; and
   a memory comprising program instructions, the program instructions executable by the at least one processor to implement an operating system (OS) platform module and an application, herein the application operable to:
      obtain a manifest file, the manifest file indicating content to be streamed to the device from a content server according to a HTTP (Hypertext Transfer Protocol) live streaming (HLS) protocol supported by the OS platform and further indicating metadata for the content, the metadata not identifying a key for decrypting the content;

access a digital rights management (DRM) server according to the metadata to obtain a license for the content and a key for decrypting the content;

modify the manifest file to include a Uniform Resource Locator (URL) for obtaining the key according to information received from the DRM server; and provide the modified manifest file to the OS platform module, the OS platform module operable to obtain the key according to the URL indicated in the modified manifest file, obtain a data stream of the indicated content from the content server, and decrypt data in the stream according to the obtained key.

10. The device as recited in claim 9, wherein the application is further operable to locally store the key in a file in a file storage area of the application, wherein the URL for obtaining the key is a file URL for the file that includes the key, and wherein the OS platform module is operable to obtain the key from the file according to the file URL.

11. The device as recited in claim 9, wherein the program instructions are further executable by the at least one processor to implement a local HTTP server on the device, wherein the application is further operable to provide the key to the local HTTP server on the device, wherein the URL for obtaining the key is a localhost URL for the local HTTP server that hosts the key, and wherein the OS platform module is further operable to obtain the key from the local HTTP server according to the localhost URL via HTTP.

12. The device as recited in claim 9, wherein the program instructions are further executable by the at least one processor to implement a local HTTPS (Hypertext Transfer Protocol Secure) server on the device, wherein the application is further operable to provide the key to the local HTTPS server on the device, wherein the URL for obtaining the key is a localhost URL for the local HTTPS server that hosts the key, and wherein the OS platform module is further operable to obtain the key from the local HTTPS server according to the localhost URL via HTTPS.

13. The device as recited in claim 9, wherein the application is further operable to locally store the key in a secure local store of the application on the device, wherein the URL for obtaining the key is an application-defined URL for a module of the application, wherein the module of the application is configured to access the key from the secure local store, and wherein the OS platform module is further operable to obtain the key from the module of the application according to the application-defined URL.

14. The device as recited in claim 9, wherein the key obtained from the DRM server is obtained as an encrypted key included in a token, wherein the URL for obtaining the key is a URL for a remote HTTPS (Hypertext Transfer Protocol Secure) service, wherein the application is further operable to include the token as a token parameter of the URL included in the manifest file, and wherein, to obtain the key, the OS platform module is operable to contact the remote HTTPS service according to the URL, wherein the remote HTTPS service decrypts the encrypted key included in the token parameter and returns the decrypted key to the OS platform module via HTTPS.

15. The device as recited in claim 14, wherein the application is further operable to sign the token with a client signature, and wherein the remote HTTPS service verifies that the signature of the token matches identifying information for the client in the token.

16. A non-transitory computer-readable storage medium storing program instructions, the program instructions computer-executable to implement an application on a device configured according to an operating system (OS) platform, the application operable to:

obtain a manifest file, the manifest file indicating content to be streamed to the device from a content server according to an HTTP (Hypertext Transfer Protocol) live streaming (HLS) protocol supported by the OS platform and further indicating metadata for the content, the metadata not identifying a key for decrypting the content;

access a digital rights management (DRM) server according to the metadata to obtain a license for the content and a key for decrypting the content;

modify the manifest file to include a Uniform Resource Locator (URL) for obtaining the key according to information received from the DRM server; and provide the modified manifest file to an OS platform module, the OS platform module obtaining the key according to the URL indicated in the modified manifest file, obtaining a data stream of the indicated content from the content server, and decrypting data in the stream according to the obtained key.

17. The non-transitory computer-readable storage medium as recited in claim 16, wherein the application is further operable to locally store the key in a file in a file storage area of the application, wherein the URL for obtaining the key is a file URL for the file that includes the key, and wherein the OS platform module obtains the key from the file according to the file URL.

18. The non-transitory computer-readable storage medium as recited in claim 16, wherein the program instructions are further computer-executable to implement a local HTTP server on the device, wherein the application is further operable to provide the key to the local HTTP server on the device, wherein the URL for obtaining the key is a localhost URL for the local HTTP server that hosts the key, and wherein the OS platform obtains the key from the local HTTP server according to the localhost URL via HTTP.

19. The non-transitory computer-readable storage medium as recited in claim 16, wherein the program instructions are further computer-executable to implement a local HTTPS server on the device, wherein the application is further operable to provide the key to the local HTTPS server on the device, wherein the URL for obtaining the key is a localhost URL for the local HTTPS server that hosts the key, and wherein the OS platform module obtains the key from the local HTTPS server according to the localhost URL via HTTPS.

20. The non-transitory computer-readable storage medium as recited in claim 16, wherein the application is further operable to locally store the key in a secure local store of the application on the device, wherein the URL for obtaining the key is an application-defined URL for a module of the application, wherein the module of the application is configured to access the key from the secure local store, and wherein the OS platform module obtains the key from the module of the application according to the application-defined URL.

21. The non-transitory computer-readable storage medium as recited in claim 16, wherein the key obtained from the DRM server is obtained as an encrypted key included in a token, wherein the URL for obtaining the key is a URL for a remote HTTPS service, wherein the application is further operable to include the token as a token parameter of the URL included in the manifest file, and wherein, to obtain the key, the OS platform module contacts the remote HTTPS service according to the URL, wherein the remote HTTP service decrypts the encrypted key included in the token parameter and returns the decrypted key to the OS platform module via HTTPS.

22. The non-transitory computer-readable storage medium as recited in claim 21, wherein the application is further operable to sign the token with a client signature, and wherein the remote HTTP service verifies that the signature of the token matches identifying information for the client in the token.

23. The non-transitory computer-readable storage medium as recited in claim 16, wherein the application is operable to perform said obtaining the manifest file in response to the OS platform module requesting the manifest file according to an application-defined URL for a module of the application.

* * * * *

UNITED STATES PATENT AND TRADEMARK OFFICE
CERTIFICATE OF CORRECTION

PATENT NO. : 8,806,193 B2
APPLICATION NO. : 13/335654
DATED : August 12, 2014
INVENTOR(S) : Swaminathan et al.

Page 1 of 1

It is certified that error appears in the above-identified patent and that said Letters Patent is hereby corrected as shown below:

In the Claims

Column 24, Line 63, after "and an application," delete "herein", therefore.

Signed and Sealed this
Twenty-fifth Day of November, 2014

Michelle K. Lee
*Deputy Director of the United States Patent and Trademark Office*